(12) United States Patent
Gorshkov et al.

(10) Patent No.: US 12,026,586 B2
(45) Date of Patent: Jul. 2, 2024

(54) QUBIT GATE AND PRODUCING A GENERALIZED CONTROLLED-NOT QUANTUM GATE

(71) Applicant: Government of the United States of America, as represented by the Secretary of Commerce, Gaithersburg, MD (US)

(72) Inventors: Alexey Vyacheslavovich Gorshkov, Rockville, MD (US); Adam Micah Kaufman, Boulder, CO (US); Jeremy Thomas Young, Broomfield, CO (US); Przemyslaw D. Bienias, Silver Spring, MD (US); Ron Belyansky, College Park, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 397 days.

(21) Appl. No.: 17/531,652

(22) Filed: Nov. 19, 2021

(65) Prior Publication Data
US 2022/0156626 A1     May 19, 2022

Related U.S. Application Data

(60) Provisional application No. 63/115,636, filed on Nov. 19, 2020.

(51) Int. Cl.
*G06N 10/00*     (2022.01)
*G06N 10/20*     (2022.01)
(Continued)

(52) U.S. Cl.
CPC ............. *G06N 10/00* (2019.01); *G06N 10/20* (2022.01); *G06N 10/40* (2022.01); *G06N 10/70* (2022.01); *G21K 1/16* (2013.01)

(58) Field of Classification Search
CPC ........ G06N 10/00; G06N 10/40; G06N 10/70; G06N 10/20; G21K 1/16
(Continued)

(56) References Cited

U.S. PATENT DOCUMENTS 9,978,020 B1 *   5/2018   Gambetta .............. G06N 10/00

OTHER PUBLICATIONS

NPL Erich Urban, Coherent Manipulation of Single Atom Qubits Using Rydberg States(Univ of Wisconsin) (Year: 2009).*
(Continued)

*Primary Examiner* — Arnold M Kinkead
(74) *Attorney, Agent, or Firm* — Office of Chief Counsel for National Institute of Standards and Technology

(57) ABSTRACT

Preparing a metrologically-relevant entangled state includes: providing a plurality of atoms in a regular lattice, wherein each atom is in an initial quantum state of a first state in a ground state manifold; initializing a central atom in the regular lattice to a $(|0\rangle+|1\rangle)/\sqrt{2}$ state while all other atoms remain in the first state $|0\rangle$ as remaining atoms; and proceeding, starting with the central atom, to propagate preparation of Greenberger-Horne-Zeilinger (GHZ) states in a nonlinear progression by increasing a number of GHZ states in each iteration through the remaining atoms in a recursive manner, to produce an intermediate GHZ state, such that the intermediate GHZ state acts as an initial GHZ state for a next iteration, until a final GHZ state is formed to prepare the metrologically-relevant entangled state of the atoms.

20 Claims, 6 Drawing Sheets

(51) Int. Cl.
*G06N 10/40* (2022.01)
*G06N 10/70* (2022.01)
*G21K 1/16* (2006.01)

(58) Field of Classification Search
USPC ......... 326/1; 714/820, 764, 776; 257/31, 34, 257/36
See application file for complete search history.

(56) References Cited

OTHER PUBLICATIONS

Brion, E., et al., "Conditional dynamics induced by new configurations for Rydberg dipole-dipole interactions", Physical Review A, 2007, p. 022334, vol. 7.

Wu, H-Z., et al., "Implementation of a multiqubit quantum phase gate in a neutral atomic ensemble via the asymmetric Rydberg blockade", Physical Review A, 2010, p. 034307, vol. 82.

Isenhower, L., et al., "Multibit CkNOT quantum gates via Rydberg blockade", Quantum Inf Process, 2011, p.755-770, vol. 10.

Molmer, K., et al., "Efficient Grover search with Rydberg blockade", Journal of Physics B: Atomic, Molecular and Optical Physics, 2011, p. 184016, vol. 44.

Gulliksen, J., et al., "Characterization of how dissipation and dephasing errors accumulate in quantum computers", EPJ Quantum Technology, 2015, p. 1-10, vol. 2 No.4.

Su, S.L., "Rydberg quantum controlled-phase gate with one control and multiple target qubits", Chinese Physics B, 2018, p. 110304, vol. 27 No. 11.

Su, S.L., et al., "One-step construction of the multiple-qubit Rydberg controlled-PHASE gate", Physical Review A, 2018, p. 032306, vol. 98.

Shi, X-F., "Deutsch, Toffoli, and CNOT Gates via Rydberg Blockade of Neutral Atoms", Physical Review Applied, 2018, p. 051001, vol. 9.

Beterov, I.I., et al., "Fast three-qubit Toffoli quantum gate based on three-body Förster resonances in Rydberg atoms", Physical Review A, 2018, p. 042704, vol. 98.

Rasmussen, S.E., et al., "Single-step implementation of high-fidelity n-bit Toffoli gates", Physical Review A, 2020, p. 022308, vol. 101.

Khazali, M., et al., "Fast multi-qubit gates by adiabatic evolution in interacting excited state manifolds", Phys. Rev. X, 2020, p. 021054, vol. 10, DOI: https://doi.org/10.1103/PhysRevX.10.021054.

Saffman, M., et al., "Efficient Multiparticle Entanglement via Asymmetric Rydberg Blockade", Physical Review Letters, 2009, p. 240502, vol. 102.

Levine ,H., et al., "Parallel Implementation of High-Fidelity Multiqubit Gates with Neutral Atoms", Physical Review Letters, 2019, p. 170503, vol. 123.

Levine ,H., et al., "Supplementary Information: Parallel Implementation of High-Fidelity Multiqubit Gates with Neutral Atoms", Physical Review Letters, 2019.

\* cited by examiner

QUBIT GATE AND PRODUCING A GENERALIZED CONTROLLED-NOT QUANTUM GATE

CROSS REFERENCE TO RELATED APPLICATIONS

This application claims the benefit of U.S. Provisional Patent Application Ser. No. 63/115,636 (filed Nov. 19, 2020), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a process for producing a multi-controlled and multi-target Z gate, the process comprising: providing a plurality of atoms, wherein the atoms comprise: a set of control atoms; and a set of target atoms, wherein each atom comprises an initial quantum state, such that the initial quantum state consists essentially of a first state $|0\rangle$ and a second state $|1\rangle$ in a ground state manifold; for each atom: making a control Rydberg state $|c\rangle$ by applying a $\pi$-polarized microwave drive and a $\sigma$-polarized microwave drive, such that the control Rydberg state $|c\rangle$ comprises a superposition of three or more initial Rydberg states; and making a target Rydberg state $|t\rangle$ by applying the $\pi$-polarized microwave drive and the $\sigma$-polarized microwave drive, such that the target Rydberg state $|t\rangle$ comprises a different superposition of the three or more initial Rydberg states, wherein: the control Rydberg state $|c\rangle$ is orthogonal to the target Rydberg state $|t\rangle$; control Rydberg states of different atoms do not interact via dipole-dipole interactions; target Rydberg states of different atoms do not interact via dipole-dipole interactions; and among different atoms, control Rydberg states interact with target Rydberg states via dipole-dipole interactions; subjecting control atoms to a $\pi$ pulse, such that the $\pi$ pulse transitions the first state $|0\rangle$ of the initial quantum state to the control Rydberg state $|c\rangle$ in the control atoms; subjecting a $2\pi$ pulse to the first state $|0\rangle$ of the target atoms via the target Rydberg state $|t\rangle$ of the target atoms, such that the $2\pi$ pulse: for all control atoms in the second state $|1\rangle$, changes the phase of the first state $|0\rangle$; and otherwise, for at least one control atom in the control Rydberg state $|c\rangle$, conserves the phase of the first state $|0\rangle$; and subjecting the control atoms to a second $\pi$ pulse, such that the second $\pi$ pulse transitions the control Rydberg state $|c\rangle$ back to the first state $|0\rangle$ in the control atoms to produce the multi-control and multi-target Z gate.

Disclosed is a process for preparing a metrologically-relevant entangled state, the process comprising: providing a plurality of atoms arranged in a regular lattice, wherein each atom comprises an initial quantum state, such that the initial quantum state consists essentially of a first state $|0\rangle$ in a ground state manifold; initializing a central atom of the atoms in the regular lattice to a $(|0\rangle+|1\rangle)/\sqrt{2}$ state, such that all other atoms remain in the first state $|0\rangle$ as remaining atoms; and proceeding, starting with the central atom, to propagate preparation of Greenberger-Horne-Zeilinger (GHZ) states in a nonlinear progression by increasing a number of atoms in the GHZ state in each iteration through the remaining atoms in a recursive manner, to produce an intermediate GHZ state, such that the intermediate GHZ state acts as an initial GHZ state for a next iteration, until a final GHZ state is formed to prepare the metrologically-relevant entangled state of the atoms.

Disclosed is a process for preparing a metrologically-relevant entangled state, the process comprising: providing a plurality of atoms arranged in a regular lattice, wherein each atom comprises an initial quantum state, such that the initial quantum state consists essentially of a first state $|0\rangle$ in a ground state manifold; initializing a central atom of the atoms in the regular lattice to a $(|0\rangle+|1\rangle)/\sqrt{2}$ state to produce a GHZ state that includes the central atom, such that: all other atoms remain in the first state $|0\rangle$ as remaining atoms; the central atom is a control atom; and the nearest neighbor atoms to control atom are target atoms; subjecting the target atoms to a Hadamard gate, such that target atoms are configured to $(|0\rangle+|1\rangle)/\sqrt{2}$ state; subjecting the control atom and the target atoms to a $C_{k=1}Z^m$ gate; subjecting the target atoms to another Hadamard gate to increase the number of atoms in the GHZ state; and repetitively increasing the size of the GHZ state, wherein during each repetition the outermost atoms of the GHZ state are used as control atoms while the nearest neighbor atoms to the control atoms outside of the GHZ state are used as target atoms, by performing the following GHZ-increasing steps: subjecting the target atoms to a Hadamard gate, such that target atoms are configured to $(|0\rangle+|1\rangle)/\sqrt{2}$ state; subjecting the control atoms and the target atoms to a $C_kZ^m$ gate; subjecting the target atoms to another Hadamard gate to increase the number of atoms in the GHZ state to prepare the metrologically-relevant entangled state; and repeating the GHZ-increasing steps.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
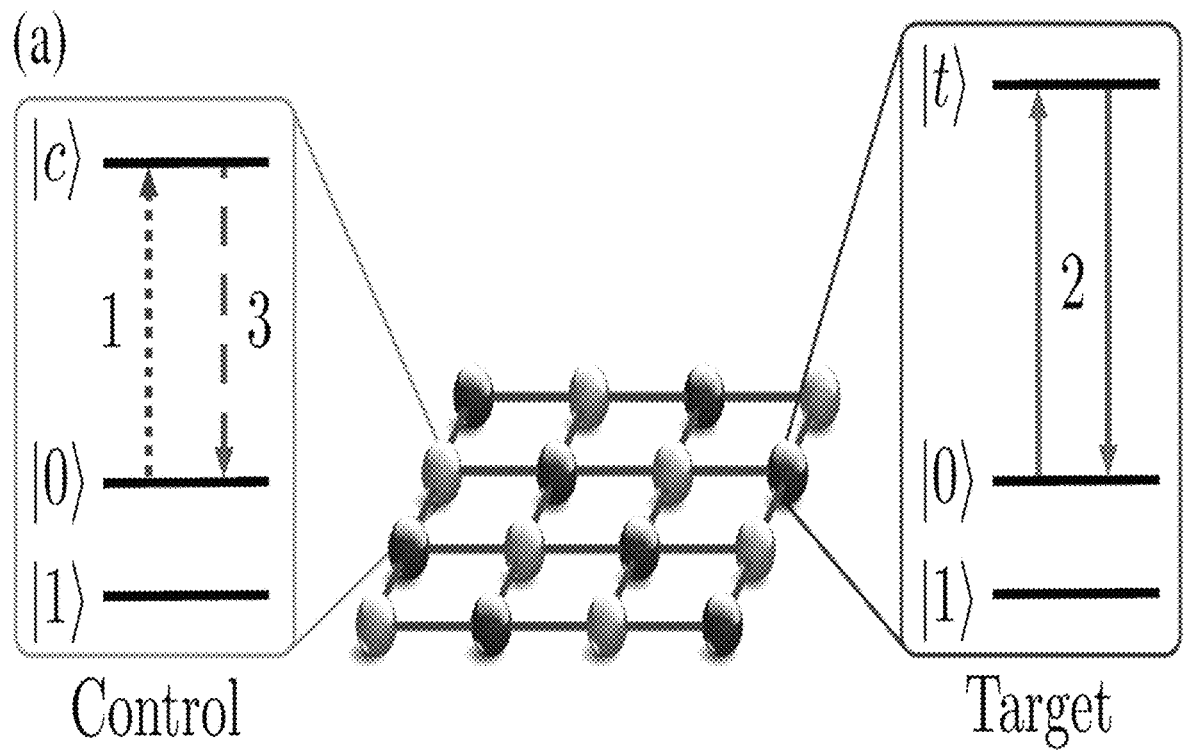
FIG. 1 shows (a) a pulse sequence to make controlled-Z gates, wherein light blue (dark green) spheres represent control (target) atoms. The configuration produces a $C_8Z^8$ gate, but other configurations of control and target atoms can be produced. (b) Intermediate step of the Greenberger-Horne-Zeilinger (GHZ) state creation. Black (white) spheres indicate atoms that are (not) part of the GHZ state. After the application of a $C_4NOT^8$ gate in (ii), the GHZ state is increased from (i) 5 to (iii) 13 atoms, according to some embodiments.
Figure 1:
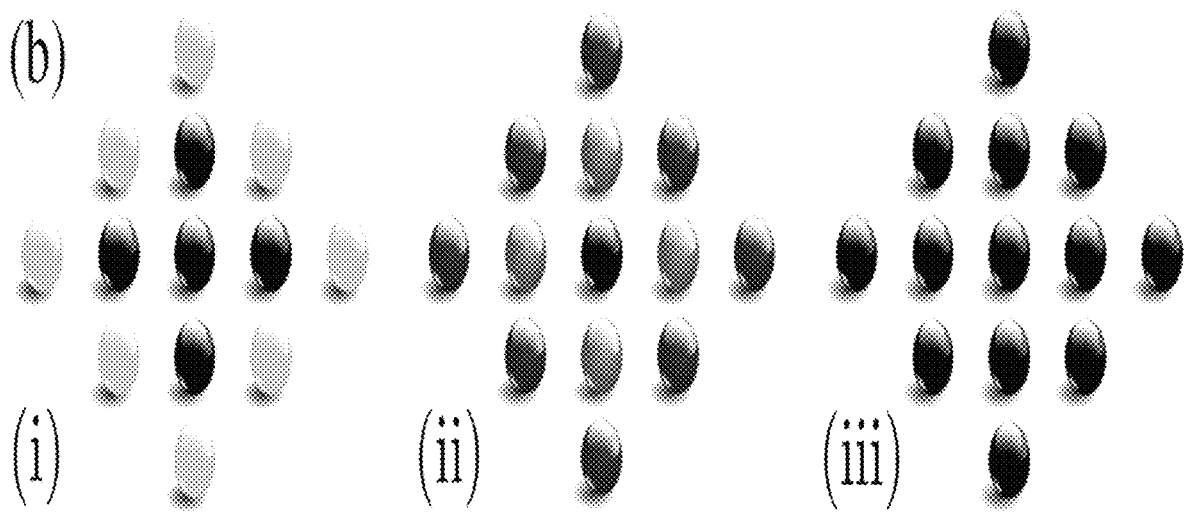

A detailed description of one or more embodiments is presented herein by way of exemplification and not limitation.

Strong, tunable interactions between Rydberg states of neutral atoms provide a versatile platform for quantum information science and quantum simulations. Rydberg blockade involves a single Rydberg excitation that prevents nearby atoms from being excited to the Rydberg state. The long-range character of Rydberg van der Waals (vdW) and dipole-dipole interactions can sustain engineering entangling gates involving many qubits. Although two-qubit entangling gates can provide quantum computing, multiqubit entangling gates can provide significant speedups for quantum algorithms and state preparation. Multitarget Rydberg gates can implement Shor's algorithm in constant time, and multicontrol Rydberg gates provide efficient implementations of Grover's search algorithm.

Some conventional approaches to make multiqubit Rydberg gates rely on asymmetric Rydberg blockade, in which there is a large separation of scales between different types of Rydberg interactions. For example, if the control-control interaction is much smaller than the control-target interaction, then control atoms can blockade target atoms without blockading other control atoms, which can be used to engineer a multicontrol gate. In some conventional cases, asymmetric Rydberg blockade occurs with strong $1/r^3$ dipole-dipole interactions and weaker $1/r^6$ vdW interactions. However, the dipole-dipole interactions are off-diagonal, which can result in many-body resonances and antiblockade, reducing gate fidelity. Moreover, these conventional techniques are limited to gates involving many controls or many targets, but not both which has applications for classical verification of quantum computers.

A two-qubit Rydberg-blockade gate involves qubit states $|0\rangle$ and $|1\rangle$ encoded in the ground-state manifold, e.g., as shown in FIG. 1(a). A π pulse (indicated by the arrow labeled "1") with Rabi frequency $\Omega_g^{(c)}$ is applied to the first atom (the control atom), which excites the $|0\rangle$ state to a Rydberg state $|c\rangle$. A pulse sequence (indicated by arrows labeled "2") involving a Rydberg state is applied to the second atom (the target atom). A 2π pulse with Rabi frequency $\Omega_g^{(t)}$ applied to the $|0\rangle$ state via the Rydberg state $|t\rangle$ (sometimes $|t\rangle=|c\rangle$). A-π pulse (indicated by the arrow labeled "3") with Rabi frequency $\Omega_g^{(c)}$ is applied to the control atom, returning the Rydberg state to the $|0\rangle$ state. When the qubits are in the $|10\rangle$ state, they pick up a minus sign due to the 2π pulse. Otherwise, the state is left unchanged. By applying a Pauli-X gate to the target qubit before and after the pulse sequence, this realizes a controlled-Z gate (CZ gate), which applies a Pauli-Z gate to the target qubit when the control qubit is in the $|1\rangle$ state.

It has been discovered that a process for engineering gates involves many control qubits and many target qubits by combining the asymmetric blockade with the two-qubit Rydberg-blockade gate using microwave fields. By dressing several Rydberg states with strong microwave fields, perfect asymmetric blockade can be produced, in which intraspecies (control-control and target-target) Rydberg interactions are negligible while interspecies (control-target) Rydberg interactions are large. Moreover, the control-target interactions will be diagonal dipole-dipole interactions, preventing many-body resonances from playing a role while still using strong dipole-dipole interactions. Such engineering is achieved by applying two microwave drives with different polarizations. Because of a sign difference in the resulting dipole-dipole interaction from each drive, the drives can be tuned so that the intraspecies interactions cancel out with one another. Using the remaining tunability, the intraspecies vdW interactions are suppressed. Since the intraspecies interactions are negligible, the same pulse sequence can be used as in the two-qubit case. This generalizes the CZ gate to a $C_k Z^m$ gate with k control qubits and m target qubits. If all control qubits are in the $|1\rangle$ state, a Pauli-Z gate is applied to each of the target qubits. Otherwise, the target qubits are unchanged. This can be generalized to realize a $C_k U_1 \ldots U_m$ gate, which applies an arbitrary controlled unitary to each target qubit. The process can include Greenberger-Horne-Zeilinger (GHZ) state preparation achieved by sequentially applying $C_k NOT^m$ gates to the k atoms at the edge of the GHZ state and their m nearest neighbors, e.g., as shown in FIG. 1(b).

Figure 2:
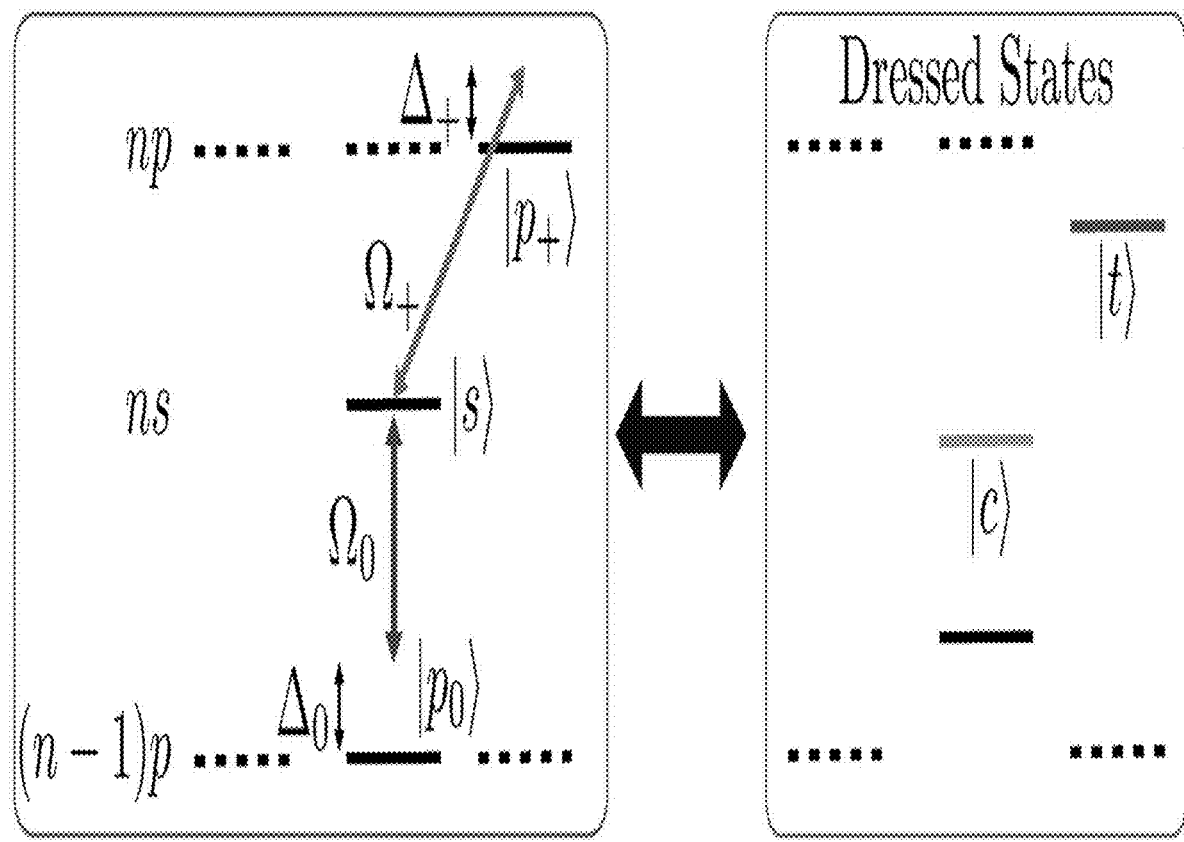
FIG. 2 shows a dressing scheme for control and target Rydberg states involving one s state (L=0) and two p states (L=1), wherein n denotes the principal quantum number, and dotted lines are not involved in the dressing. The $|s\rangle$ state is coupled to the $|p_0\rangle$ state with Rabi frequency $\Omega_0$ and detuning $\Delta_0$. The $|s\rangle$ state is coupled to the $|p_+\rangle$ state using Rabi frequency $\Omega_+$ and detuning $\Delta_+$. The right side of the figure shows resulting dressed states $|c\rangle$, $|t\rangle$ and a third, unused dressed state, according to some embodiments.

In an embodiment, with reference to FIG. 1 and FIG. 2, a process for producing a multi-controlled and multi-target Z gate includes: providing a plurality of atoms 201, wherein the atoms 201 include: a set of control atoms 202; and a set of target atoms 203, wherein each atom 201 includes an initial quantum state, such that the initial quantum state consists essentially of a first state $|0\rangle$ and a second state $|1\rangle$ in a ground state manifold 204; for each atom 201: making a control Rydberg state $|c\rangle$ by applying a π-polarized microwave drive 205 and a σ-polarized microwave drive 206, such that the control Rydberg state $|c\rangle$ includes a superposition of three or more initial Rydberg states 207; and making a target Rydberg state $|t\rangle$ by applying the π-polarized microwave drive 205 and the σ-polarized microwave drive 206, such that the target Rydberg state $|t\rangle$ includes a different superposition of the three or more initial Rydberg states 207, wherein: the control Rydberg state $|c\rangle$ is orthogonal to the target Rydberg state $|t\rangle$; control Rydberg states of different atoms 201 do not interact via dipole-dipole interactions; target Rydberg states of different atoms 201 do not interact via dipole-dipole interactions; and among different atoms 201, control Rydberg states interact with target Rydberg states via dipole-dipole interactions; subjecting control atoms 202 to a π pulse 208, such that the π pulse 208 transitions the first state $|0\rangle$ of the initial quantum state to the control Rydberg state $|c\rangle$ in the control atoms 202; subjecting a 2π pulse 209 to the first state $|0\rangle$ of the target atoms 203 via the target Rydberg state $|t\rangle$ of the target atoms 203, such that the 2π pulse 209: for all control atoms 202 in the second state $|1\rangle$, changes the phase of the first state $|0\rangle$; and otherwise, for at least one control atom 202 in the control Rydberg state $|c\rangle$, conserves the phase of the first state $|0\rangle$; and subjecting the control atoms 202 to a second π pulse 208, such that the second π pulse 208 transitions the control Rydberg state $|c\rangle$ back to the first state $|0\rangle$ in the control atoms 202 to produce the multi-control and multi-target Z gate.

In an embodiment, k control atoms 202 and m target atoms 203, the multi-controlled and multi-target Z gate is a $C_k Z^m$ gate, wherein k is the number of control atoms 202 and m is the number of target atoms 203.

In an embodiment, the process further includes adjusting drive parameters of the π-polarized microwave drive 205 and the σ-polarized microwave drive 206, so that: atoms 203 in the control Rydberg state $|c\rangle$ have negligible interactions with atoms in the control Rydberg state $|c\rangle$; atoms 203 in the target Rydberg state $|t\rangle$ have negligible interactions with atoms in the target Rydberg state $|t\rangle$; and atoms 203 in control Rydberg state $|c\rangle$ have interact strongly with atoms 203 in target Rydberg state $|t\rangle$. In an embodiment, the drive parameters comprise Rabi frequencies and detuning frequencies of the π-polarized microwave drive 205 and the σ-polarized microwave drive 206.

In an embodiment, a process for producing a generalized controlled-not quantum gate includes providing a plurality of atoms 201, wherein the atoms 201 include: a set of control atoms 202; and a set of target atoms 203, wherein each atom 201 includes an initial quantum state, such that the initial quantum state consists essentially of a first state $|0\rangle$ and a second state $|1\rangle$ in a ground state manifold 204; subjecting the target atoms 201 to a single-qubit Hadamard gate; for each atom 201: making a control Rydberg state $|c\rangle$ by applying a π-polarized microwave drive 205 and a σ-polarized microwave drive 206, such that the control Rydberg state $|c\rangle$ includes a superposition of three or more initial Rydberg states 207; and making a target Rydberg state $|t\rangle$ by applying the π-polarized microwave drive 205 and the σ-polarized microwave drive 206, such that the target Rydberg state $|t\rangle$ includes a different superposition of the three or more initial Rydberg states 207, wherein: the control Rydberg state $|c\rangle$ is orthogonal to the target Rydberg state $|t\rangle$; control Rydberg states of different atoms 201 do not interact via dipole-dipole interactions; target Rydberg states of different atoms 201 do not interact via dipole-dipole interactions; and among different atoms 201, control Rydberg states interact with target Rydberg states via dipole-dipole interactions; subjecting control atoms 202 to a π pulse 208, such that the π pulse 208 transitions the first state $|0\rangle$ of the initial quantum state to the control Rydberg state $|c\rangle$ in the control atoms 202; subjecting a 2π pulse 209 to the first state $|0\rangle$ of the target atoms 203 via the target Rydberg state $|t\rangle$ of the target atoms 203, such that the 2π pulse 209: for all control atoms 202 in the second state $|1\rangle$, changes the phase of the first state $|0\rangle$; and otherwise, for at least one control atom 202 in the control Rydberg state $|c\rangle$, conserves the phase of the first state $|0\rangle$; and subjecting the control atoms 202 to a second π pulse 208, such that the second π pulse 208 transitions the control Rydberg state $|c\rangle$ back to the first state $|0\rangle$ in the control atoms 202 to produce a multi-control and multi-target Z gate; and subjecting the target atoms 201 in the multi-control and multi-target Z gate to a second single-qubit Hadamard gate to produce the generalized controlled-not quantum gate. In an embodiment, for k control atoms 202 and m target atoms 203, the multi-controlled and multi-target Z gate is a $C_k Z^m$ gate, wherein k is the number of control atoms 202 and m is the number of target atoms 203.

In an embodiment, the process for producing the generalized controlled-not quantum gate further includes adjusting drive parameters of the π-polarized microwave drive 205 and the σ-polarized microwave drive 206, so that: atoms 203 in the control Rydberg state $|c\rangle$ have negligible interactions with atoms in the control Rydberg state $|c\rangle$; atoms 203 in the target Rydberg state $|t\rangle$ have negligible interactions with atoms in the target Rydberg state $|t\rangle$; and atoms 203 in control Rydberg state $|c\rangle$ have interact strongly with atoms 203 in target Rydberg state $|t\rangle$. The drive parameters can include Rabi frequencies and detuning frequencies of the π-polarized microwave drive 205 and the σ-polarized microwave drive 206.

Figure 6:
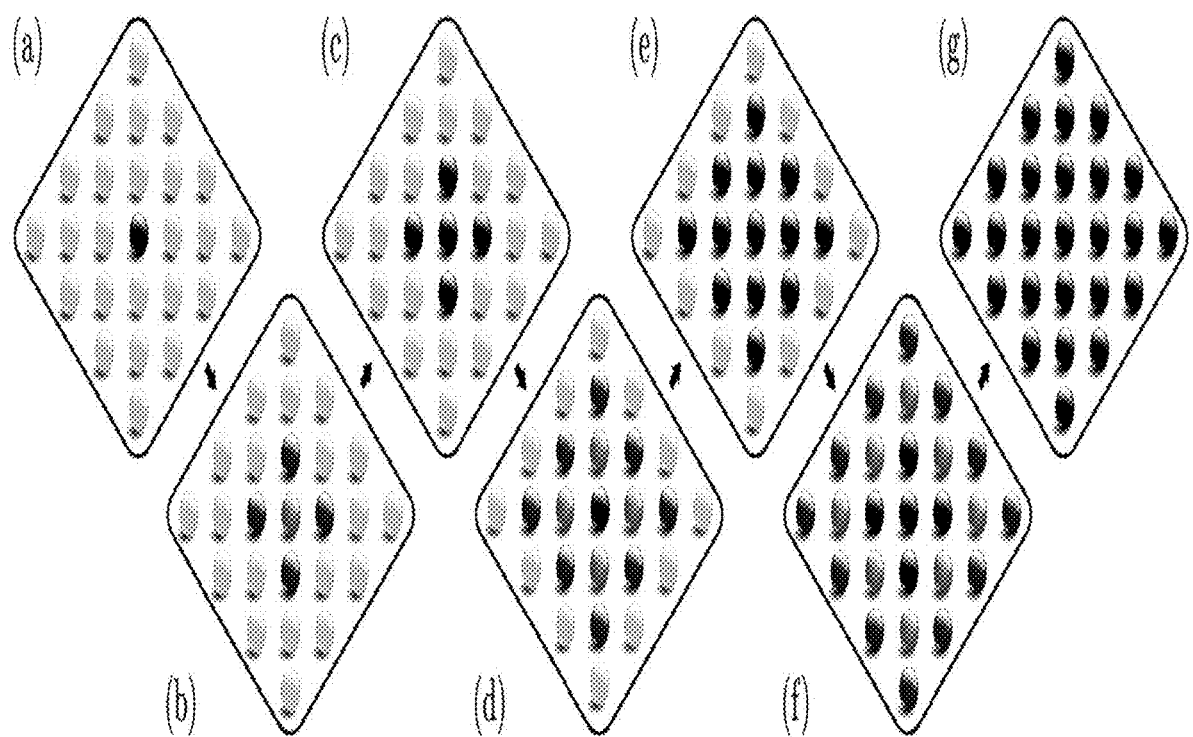
FIG. 6 shows GHZ state preparation steps. The light blue spheres denote the control atoms, the dark green spheres denote the target atoms, and the white and black spheres indicate atoms not involved in a given step. The light blue and black atoms together are in a GHZ state. Initially, the GHZ state is composed of (a) 1 atom. After each gate (b,d,f), the new GHZ state includes (c) 5, (e) 13, or (g) 25 atoms.

In an embodiment, with reference to FIG. 6, a process for preparing a metrologically-relevant entangled state includes: providing a plurality of atoms 201 arranged in a regular lattice 210, wherein each atom 201 includes an initial quantum state, such that the initial quantum state consists essentially of a first state |0⟩ in a ground state manifold 204; initializing a central atom 211 of the atoms 201 in the regular lattice 210 to a (|0⟩+|1⟩)/√2 state, such that all other atoms 201 remain in the first state |0⟩ as remaining atoms 213; and proceeding, starting with the central atom 211, to propagate preparation of Greenberger-Horne-Zeilinger (GHZ) states in a nonlinear progression by increasing a number of GHZ states in each iteration through the remaining atoms 213 in a recursive manner, to produce an intermediate GHZ state, such that the intermediate GHZ state acts as an initial GHZ state for a next iteration, until a final GHZ state is formed to prepare the metrologically-relevant entangled state of the atoms 201. The metrologically-relevant entangled state comprises the GHZ state.

In an embodiment, a process for preparing a metrologically-relevant entangled state includes providing a plurality of atoms 201 arranged in a regular lattice 210, wherein each atom 201 includes an initial quantum state, such that the initial quantum state consists essentially of a first state |0⟩ in a ground state manifold 204; initializing a central atom 211 of the atoms 201 in the regular lattice 210 to a (|0⟩+|1⟩)/√2 state to produce a GHZ state that includes the central atom 211, such that: all other atoms 201 remain in the first state |0⟩ as remaining atoms 213; the central atom 211 is a control atom 202; and the nearest neighbor atoms 212 to control atom 202 are target atoms 203; subjecting the target atoms 203 to a Hadamard gate, such that target atoms 203 are configured to (|0⟩+|1⟩)/√2 state; subjecting the target atoms 203 in (|0⟩+|1⟩)/√2 state to a $C_k Z^m$ gate; subjecting the target atoms 203 to another Hadamard gate to increase the number of atoms in the GHZ state; and repetitively increasing the size of the GHZ state, wherein during each repetition the outermost atoms 201 of the GHZ state are used as control atoms 202 while the nearest neighbor atoms 212 to the control atoms 202 outside of the GHZ state are used as target atoms 203, by performing the following GHZ-increasing steps: subjecting the target atoms 203 to a Hadamard gate, such that target atoms 203 are configured to (|0⟩+|1⟩)/√2 state; subjecting the target atoms 203 in (|0⟩+|1⟩)/√2 state to a $C_k Z^m$ gate; subjecting the target atoms 203 to another Hadamard gate to increase the number of atoms in the GHZ state to prepare the metrologically-relevant entangled state; and repeating the GHZ-increasing steps. In an embodiment, subjecting the target atoms 203 in (|0⟩+|1⟩)/√2 state to the $C_k Z^m$ gate comprises: for each target atom 203: making a control Rydberg state |c⟩ by applying a π-polarized microwave drive 205 and a σ-polarized microwave drive 206, such that the control Rydberg state |c⟩ includes a superposition of three or more initial Rydberg states 207; and making a target Rydberg state |t⟩ by applying the π-polarized microwave drive 205 and the σ-polarized microwave drive 206, such that the target Rydberg state |t⟩ includes a different superposition of the three or more initial Rydberg states 207, wherein: the control Rydberg state |c⟩ is orthogonal to the target Rydberg state |t⟩; control Rydberg states of different atoms 201 do not interact via dipole-dipole interactions; target Rydberg states of different atoms 201 do not interact via dipole-dipole interactions; and among different atoms 201, control Rydberg states interact with target Rydberg states via dipole-dipole interactions; subjecting control atoms 202 to a π pulse 208, such that the π pulse 208 transitions the first state |0⟩ of the initial quantum state to the control Rydberg state |c⟩ in the control atoms 202; subjecting a 2π pulse 209 to the first state |0⟩ of the target atoms 203 via the target Rydberg state |t⟩ of the target atoms 203, such that the 2π pulse 209: for all control atoms 202 in the second state |1⟩, changes the phase of the first state |0⟩; and otherwise, for at least one control atom 202 in the control Rydberg state |c⟩, conserves the phase of the first state |0⟩; and subjecting the control atoms 202 to a second π pulse 208, such that the second π pulse 208 transitions the control Rydberg state |c⟩ back to the first state |0⟩ in the control atoms 202 to produce a multi-control and multi-target Z gate. It should be appreciated that the metrologically-relevant entangled state comprises the GHZ state.

In an embodiment, atoms 201 comprise a neutral alkali atom, an alkaline earth atom, an alkaline earth-like atom, and the like. Alkaline earth-like atoms include atoms having two electrons in the outermost shell such as beryllium, ytterbium, barium, radium, cadmium, mercury, and the like. Atoms 201 can be in the gas phase and disposed in a suitable container such as a vacuum chamber so that various techniques for subjecting the atoms to electromagnetic radiation can be used such as optical tweezers and the like. A number of atoms 201 and size of regular lattice 210 can be selected based on application of the particular gate formed.

In making certain gates, e.g., the multi-control and multi-target Z gate, the initial Rydberg states can include, e.g., an s state, p state, d state, and the like, or a combination of the foregoing states. During formation of the control Rydberg state |c⟩ and the target Rydberg state |t⟩, the initial Rydberg states form superpositions via transitions that follow a one-unit change in angular momentum L, i.e., ΔL=±1.

In preparing the metrologically-relevant entangled state of atoms 201, atoms 201 are arranged in regular lattice 210. It is contemplated that regular lattice 210 can be any regular lattice such as a square lattice, a rectangular, a honeycomb lattice, and the like of atom 201.

Various types of radiation can be used in the processes herein. In an embodiment, in subjecting control atoms 202 to π pulse 208, π pulse 208 can be a first optical radiation. Moreover, in subjecting 2π pulse 209 to first state |0⟩ of target atoms 203 via target Rydberg state |t⟩ of target atoms 203, 2π pulse 209 can be a second optical radiation. The first optical radiation and second optical radiation are typically different wavelengths but based on the relevant frequency of a particular transition.

Desired interactions are obtained from the dressing scheme in FIG. 2. This couples a Rydberg s state (L=0) to two Rydberg p states (L=1) with different principal quantum numbers. Although a specific dressing scheme is shown, the manipulation occurs with one microwave field that drives a π transition while another microwave field drives a σ transition, which will be used to destructively interfere two interaction terms. Additional drives would provide more tunability. The Hamiltonian for this dressing, in the rotating frame and under the rotating wave approximation, is $$H_{mw} = -\Delta_0 |p_0\rangle\langle p_0| + \Omega_0 |s\rangle\langle p_0| + \Omega_0^* |p_0\rangle\langle s| - \Delta_+$$
$$|p_+\rangle\langle p_+| + \Omega_+ |s\rangle\langle p_+| + \Omega_+^* |p_+\rangle\langle s|, \quad (1)$$

wherein $\Delta_{0/+} = \nu_{0/+} - \omega_{0/+}$ denotes the detuning of the drives ($\nu_{0/+}$ and $\omega_{0/+}$ are the drive and transition frequencies, respectively) and $\Omega_{0/+}$ the Rabi frequency of the drive from |s⟩ to $|p_{0/+}\rangle$.

Since the s and p states have different orbital angular momenta, the resultant dressed states experience dipole-dipole interactions. In the rotating frame of both microwave fields, atoms i and j interact via $$V_{dd}^{(i,j)} = \frac{1 - 3\cos^2\theta_{ij}}{r_{ij}^3}(\mu_0^2|s_i p_{j,0}\rangle\langle p_{i,0} s_j| - \mu_+^2/2|s_i p_{j,+}\rangle\langle p_{i,+} s_j|) + H.c., \quad (2)$$

where $r_{ij}$ is the distance between atoms i and j, $\theta_{ij}$ is the angle the displacement vector makes with the quantization axis, and $\mu_0 = \langle p_0|d_0|s\rangle$, $\mu_+ = \langle p_+|d_+|s\rangle$ are transition dipole moments, where $d_p = \hat{e}_p \cdot d$ is a component of the dipole operator d and $\hat{e}_0 = \hat{z}$, $\hat{e}_\pm = \mp(\hat{x} \pm i\hat{y})/\sqrt{2}$. There are additional interaction terms with different angular dependencies that do not preserve total $m_L$ (e.g., $|s_i p_{j,+}\rangle\langle p_{i,0} s_j|$) and oscillate with frequencies $2v_+$, $2v_0$, or $v_+ \pm v_0$ in the rotating frame. When the two p states are from different p-state manifolds, these interactions can be dropped via the rotating wave approximation, although in other contexts they can be used as a resource to engineer useful interactions Design the dressing such that only interspecies interactions are nonzero. Consider a general pair of unnormalized control and target Rydberg states, $|c\rangle$ and $|t\rangle$, which are eigenstates of $H_{mw}$:

$$|c\rangle \propto |s\rangle + c_0|p_0\rangle + c_+|p_+\rangle, \quad (3a)$$

$$|t\rangle \propto |s\rangle + t_0|p_0\rangle + t_+|p_+\rangle. \quad (3b)$$

For large drive $\omega_{0/+} \gg V_{dd}$, the two-atom Rydberg states are product states of the one-atom Rydberg states: $|cc\rangle$, $|tt\rangle$, $|ct\rangle$, $|tc\rangle$. This holds for N-atom Rydberg states up to perturbative corrections, which are captured by vdW interactions. The intraspecies interactions for $|c\rangle$ and $|t\rangle$ are $$V_{cc} = \langle cc|V_{dd}|cc\rangle \propto |c_0|^2\mu_0^2 - |c_+|^2\mu_+^2/2, \quad (4a)$$

$$V_{tt} = \langle tt|V_{dd}|tt\rangle \propto |t_0|^2\mu_0^2 - |t_+|^2\mu_+^2/2, \quad (4a)$$

where the atom indices i, j have been dropped. From this, while it is not possible to nullify the intraspecies interactions using only a single p state, it is possible with two p states. The sign difference is the origin of the requirement that both $\pi$- and $\sigma$-transition drives are needed. By fixing $|c^+|^2 = 2M^2|c_0|^2$ and $|t^+|^2 = 2M^2|t^0|^2$ where $M = \mu_0/\mu_+$, the intraspecies interactions are 0. Although these two constraints are the same for both states, this does not require $|c\rangle = |t\rangle$ because the phases and magnitudes of the coefficients for the two states can be different.

Consider the off-diagonal interactions between $|c\rangle$ and $|t\rangle$. The strength of the only resonant off-diagonal term is related to the two intraspecies interactions $\langle c_t|V_{dd}|t_c\rangle \propto N_c^4 V_{cc} + N_t^4 V_{tt}$, where $N_{c/t}$ are state normalization factors. As a result, this interaction is zero when the intraspecies interactions are zero. The remaining off-diagonal terms, such as those proportional to $|cc\rangle\langle tt|$, need not be reduced as long as they are sufficiently off-resonant.

Since the interspecies interaction is the source of Rydberg blockade in the gate, it must be large. This interaction is $$V_{ct} = \langle ct|V_{dd}|ct\rangle \propto c_0 t_0^* \mu_0^2 - c_+ t_+^* \mu_+^2/2 + c.c. \quad (5)$$

Although Eq. (5) is similar to Eq. (4), the phases of the coefficients matter, wherein phases of $c_0$, $c_+$ can be absorbed into $|p_0\rangle$, $|p_+\rangle$, leaving only the phases of $t_0$, $t_+$ free. The intraspecies interaction is maximized when $t_0$, $t_+$ are real and have opposite signs.

Additionally, assume that $|c\rangle$ and $|t\rangle$ come from the same drives, which are applied to all atoms. This enforces the constraint $$\langle c|t\rangle \propto 1 + t_0 c_0^* + t_+ c_+^* = 0. \quad (6)$$

Taking $c_+ = \sqrt{2} M c_0$ and $t_+ = -\sqrt{2} M t_0$ for real $t_0$, $c_0$, $$t_0 = \frac{1}{(2M^2 - 1)c_0}. \quad (7)$$

As long as $M^2 \neq \frac{1}{2}$, both dressed states can be realized with the same drives. The values of $\Omega_{0/+}$, $\Delta_{0/+}$ may be determined, up to an overall scale, by requiring that both states are eigenvectors of $H_{mw}$. The maximum interspecies interaction under this constraint is $$V_{ct}^{max} = \min\left(\frac{\mu_0^2}{\mu_+^2/2}, \frac{\mu_+^2/2}{\mu_0^2}\right)(\mu_0^2 - \mu_+^2/2), \quad (8a)$$

$$c_0^{max} = |2M^2 - 1|^{-\frac{1}{2}}, \quad (8b)$$

wherein $c_0^{max}$ denotes the value of $c_0$ that realizes this interaction. The min function reflects the fact that the smaller of the two undressed dipole-dipole interactions will set the overall scale of the interaction. Near this maximal interaction strength, the light shifts for $|c\rangle$ and $|t\rangle$ become degenerate, precluding $\pi$ pulses that excite only one or the other and violating the assumption that several off-diagonal interactions are off-resonant. To avoid these issues, we set $c_0 = \alpha c_0^{max}$ for $\alpha \neq 1$, removing this degeneracy. While this change reduces the interspecies interaction strength, it remains comparable to the maximal interspecies interaction.

For strong drive, the level structure can lead to additional Rydberg states being dressed, such as when the fine structure is comparable to $\Omega_{0/+}$. Although this modifies $H_{mw}$ and precludes an analytic solution, it nevertheless remains possible to realize asymmetric blockade.

With regard to suppressing vdW interactions, since intraspecies dipole-dipole interactions for $|c\rangle$ and $|t\rangle$ are eliminated, intraspecies vdW interactions are relevant. While the dipole-dipole interactions are much larger than the vdW interactions for the same atomic separation, it is important to compare intraspecies interactions at short distances to interspecies interactions at long distances. The target-target vdW interaction is particularly important, as $\Omega_g^{(t)}$ must be simultaneously stronger than the vdW interaction and weaker than the blockade interaction $V_{ct}$. In contrast, $\Omega_g^{(c)}$ is not limited by $V_{ct}$. Additionally, it is important to ensure that the corrections remain perturbative so higher-order processes do not lead to antiblockade and avalanche processes.

The relevant vdW interactions take the form $$V_{vdW}^{(i,j)} = -\frac{C_6^{(c)}(\theta_{ij})}{r_{ij}^6}|c_ic_j\rangle\langle c_ic_j| - \quad (9)$$

$$\frac{C_6^{(t)}(\theta_{ij})}{r_{ij}^6}|t_it_j\rangle\langle t_it_j| - \frac{C_6^{(+)}(\theta_{ij})}{r_{ij}^6}|+_{ij}\rangle\langle +_{ij}| - \frac{C_6^{(-)}(\theta_{ij})}{r_{ij}^6}|-_{ij}\rangle\langle -_{ij}|,$$

where $C_6^{(c)}$, $C_6^{(t)}$, $C_6^{(+)}$, $C_6^{(-)}$ denote the strength of the vdW interactions for $|c\rangle$, $|t\rangle$, and the symmetric or antisymmetric states $|\pm\rangle = (|ct\rangle \pm |tc\rangle)/\sqrt{2}$, respectively, which are a result of second-order nondegenerate perturbation theory. Since the off-resonant coupling strengths and energy differences are dependent on the dressing, the strength of the vdW interactions changes as a function of the dressing, making them tunable. Two degrees of freedom allow this tunability. The first is the overall scale of the dressing fields. By varying $H_{mw}$ by a constant factor, the dressed states remain the same while the light shifts change, modifying the perturbative calculation of $C_6$. The second degree of freedom is encoded in a. This picture is not qualitatively modified due to additional coupled states although the modification to $H_{mw}$ is less trivial.

Figure 3:
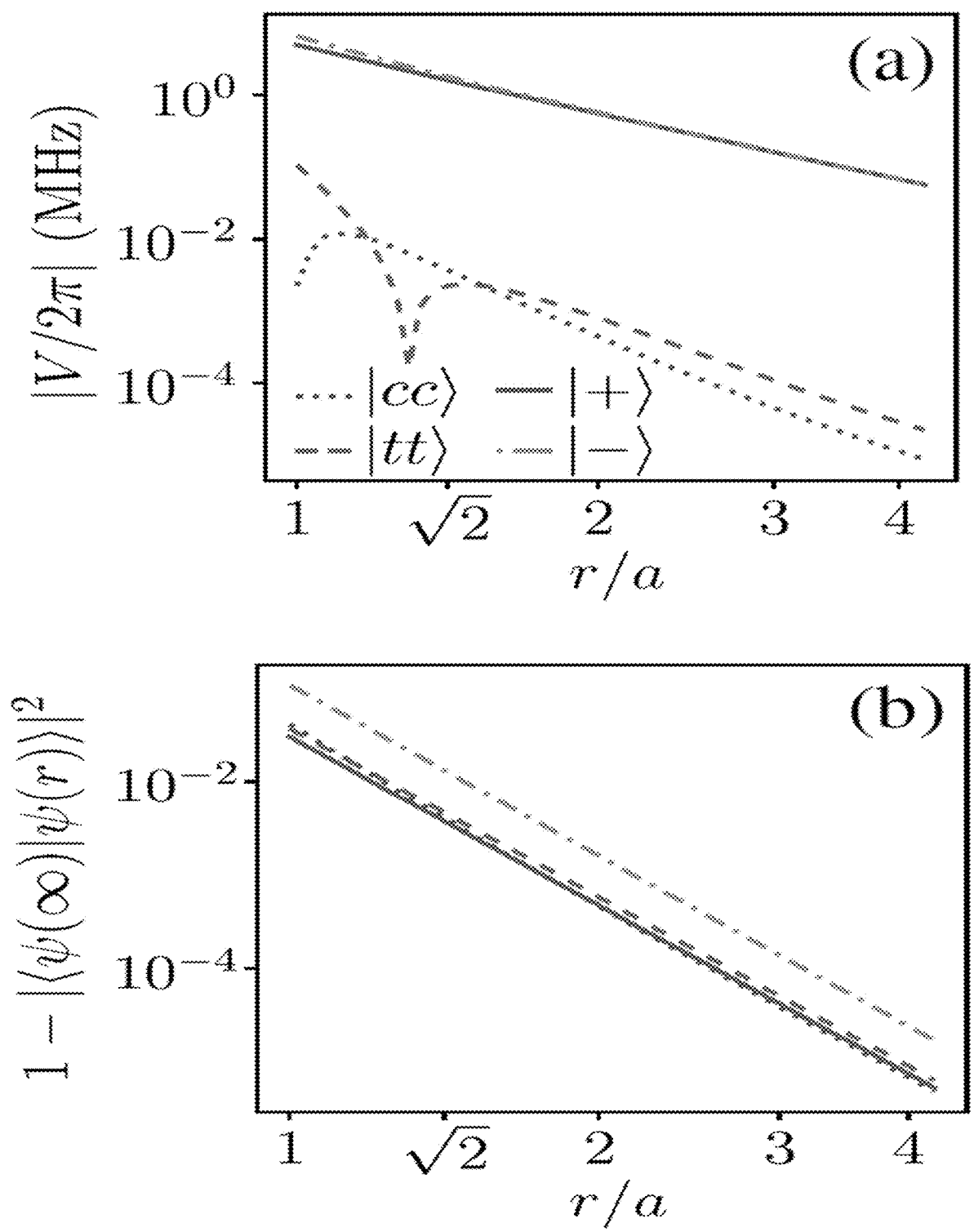
FIG. 3 shows (a) dressed interactions and (b) deviations from dressed state basis $1-|\langle\psi(\infty)|\psi(r)\rangle|^2 \propto r^{-6}$ for $|\psi(\infty)\rangle=|cc\rangle$, $|tt\rangle$, $|\pm\rangle$. States dressed are $|s\rangle=|n=60, L=0, J=\frac{1}{2}, m_J=\frac{1}{2}\rangle$, $|p_0\rangle=|n=60, L=1, J=\frac{1}{2}, m_J=\frac{1}{2}\rangle$, $|p_+\rangle=|n=59, L=1, J=\frac{1}{2}, m_J=-\frac{1}{2}\rangle$ of $^{87}$Rb for $\theta_{ij}=\pi/2$ using exact diagonalization in a Floquet basis with lattice spacing a=5.5 μm. Dressing parameters are $(\Omega_0, \Delta_0, \Omega_+, \Delta_+)/2\pi=(-265, -223, 176, 200)$ MHz, where a negative Rabi frequency indicates the importance of the relative phase of the drives and determines the light shifts. The effects of coupling to $|p'_0\rangle=|n=60, L=1, J=3/2, M_J=\frac{1}{2}\rangle$, $|p'_+\rangle=|n=59, L=1, J=3/2, M_J=-\frac{1}{2}\rangle$ are also accounted for. Interaction fits give $C_3^{(ct)}/2\pi=-730$ MHz μm³ and $(C_6^{(c)}, C_6^{(t)}, C_6^{(+)}, C_6^{(-)})/2\pi=(0.6, -1.8, -17, -64)$ GHz μm⁶ and $|E_c-E_t|/2\pi=307$ MHz. The lifetimes of $|c\rangle$ and $|t\rangle$ are $\tau_c=431$ μs and $\tau_t=356$ μs.

This allows for the ability to nullify $C_6^{(t)}$. This can be understood by considering the existence of two-atom resonances, which arise when one of the dressed pair states under consideration (e.g., $|cc\rangle$) becomes degenerate with a different Rydberg pair state. At a resonance, the energy difference of the two pair states passes through zero and $C_6^{(t)}$ changes signs, leading to zero crossings due to the presence of multiple resonances. Because of the additional tunable parameter, one may simultaneously identify parameters where the vdW interactions are most perturbative, allowing for stronger interspecies interactions and ensuring the validity of the dressed-state basis (hence $\Omega_{mw} \gg V_{ct}$). In FIG. 3, we illustrate an example that uses this tunability. Because the dipole-dipole interactions have multiple angular dependencies, vdW nullification is only valid for fixed $\theta_{ij}$. This procedure is approximately independent of n aside from overall energy and length scales, and the gate performance is comparable for different n.

With regard to gate performance, sources of error include dissipation, vdW interactions, and imperfect blockade. For a square $2\pi$ pulse or two square $\pi$ pulses, the probability of decay for a single Rydberg atom is $\varepsilon_y = \pi/2/\Omega_g \tau$, where $\Omega_g$ is the Rabi frequency of the pulses and $\tau$ is the lifetime of the Rydberg state. The error due to vdW interactions scales as $\varepsilon_{vdW} \sim (V_{vdW}/\Omega_g)^2$, where $V_{vdW}$ is the total vdW blockade strength. Error due to imperfect blockade scales as $\varepsilon_b \sim (\Omega_g^{(t)}/V_b)^2$, where $V_b$ is the total dipole-dipole blockade strength.

Respecting performance of these gates, consider two scenarios using the dressing shown in FIG. 3. In the first, consider a $C_8Z^8$ gate on a 4×4 checkerboard lattice FIG. 1(a). We consider the average fidelity $$F(G,U) = \int |\langle \psi|U^\dagger G|\psi\rangle|^2 d\psi, \quad (10)$$

where U is the ideal implementation of the gate, G is the physical implementation of the gate, and the integral is performed over the normalized Haar measure $d\psi$. We have assumed G is unitary since we can treat the dissipation errors separately. Because of the large Hilbert space, estimate F via Haar random sampling of $|\psi\rangle$ The corresponding error is 1−F. Optimizing the pulse strengths and phases, we find a gate error of 18.5% using $\Omega_g^{(c)}/2\pi = 1$ MHz and $\Omega_g^{(t)}/2\pi = 47$ kHz, approximately half of which is due to dissipation. For the $C_8Z^8$ gate, $\Omega_g^{(t)}$ is comparable to the smallest interspecies interaction. This does not lead to large errors because there are very few input states that have such small blockade strengths, and typically multiple control atoms will provide blockade. If the probability of small $V_b$ is significant, smaller Rabi frequencies should be used. Although this increases the Rydberg dissipation probability, fewer atoms are excited to a Rydberg state, and these partially balance each other. In general, the larger gates are more suited to implementations where some information is known about the typical $V_b$. If we consider a 3×3 lattice using $\Omega_g^{(t)} = \min V_b/8$, the $C_5Z^4$ gate and $C_4Z^5$ gate have errors of 8.4% and 8.9%, respectively.

In the second scenario, we use these gates to create 13- and 25-atom GHZ states using two or three steps, respectively. This is achieved by using $C_k\text{NOT}^m$ gates, which can be realized by applying single-qubit Hadamard gates to the target qubits before and after the $C_kZ^m$ gate. Initially, all qubits in a square lattice are in $|0\rangle$ except for one, which starts in $(|0\rangle+|1\rangle)/\sqrt{2}$. At each step, the boundary atoms of the GHZ state are used as controls and their outer nearest neighbors as targets, as shown in FIG. 1(b). The 13- and 25-atom GHZ states have errors of 2.8% and 5.8%. Although two-qubit gates with a theoretical minimal error of 0.3% have comparable errors (3.6% and 7.2%), they require 12 and 24 gates, respectively, as well as much larger Rabi frequencies.

Processes described use microwave-dressed Rydberg states to realize gates involving multiple control qubits and multiple target qubits. These gates can be used to simplify quantum protocols, greatly reducing the number of gates needed, and this reduces the need for fault-tolerant error correction. These principles can be generalized to many drives, e.g., using locally addressable optical drives to realize local dressing, providing superior tunability. Moreover, the application of strong microwave fields provides a new approach to realizing novel, tunable interactions for quantum simulation and can be used for nondestructive cooling by engineering state-insensitive interactions or monitoring quantum simulators with quantum nondemolition couplings. Similarly, it is worth exploring ways to realize multiqubit gates beyond two-qubit generalizations. For example, more general forms of controlled-unitary gates and controlled Hamiltonian evolution, which has potential applications in anyonic interferometry, measuring quantum information scrambling, quantum phase estimation, and quantum metrology with indefinite causal order, and which also has close connections to the central spin model. Additionally, these methods have potential applications in speeding up state transfer and the preparation of multiscale entanglement renormalization ansatz using the long-range $1/r^3$ interactions. The processes can be applied to other systems with dipole-dipole interactions, such as polar molecules, magnetic atoms, and nitrogen-vacancy centers in diamond.

The multi-qubit $C_kZ^m$ gates can be generalized to generic $C_kU_1 \ldots U_m$ gates, in which an arbitrary unitary $U_i$ gate is applied to the $i^{th}$ qubit. This is achieved since a single-qubit unitary can be written in the form $U = e^{i\delta}W$, where $W \in SU(2)$. Additionally, we take advantage of the fact that there exist matrices A, B, C $\in SU(2)$ such that $ABC = I$ and $W = AZBZC$.

The latter of these two identities implies a simple way to realize a two-qubit CW gate: apply A, CZ, B, CZ, C, where A, B, C are applied to the target qubit. The generalization to multiple controls and targets is straightforward. For each target qubit, we choose $A_i$, $B_i$, $C_i$ such that W is applied to that qubit.

Figure 4:
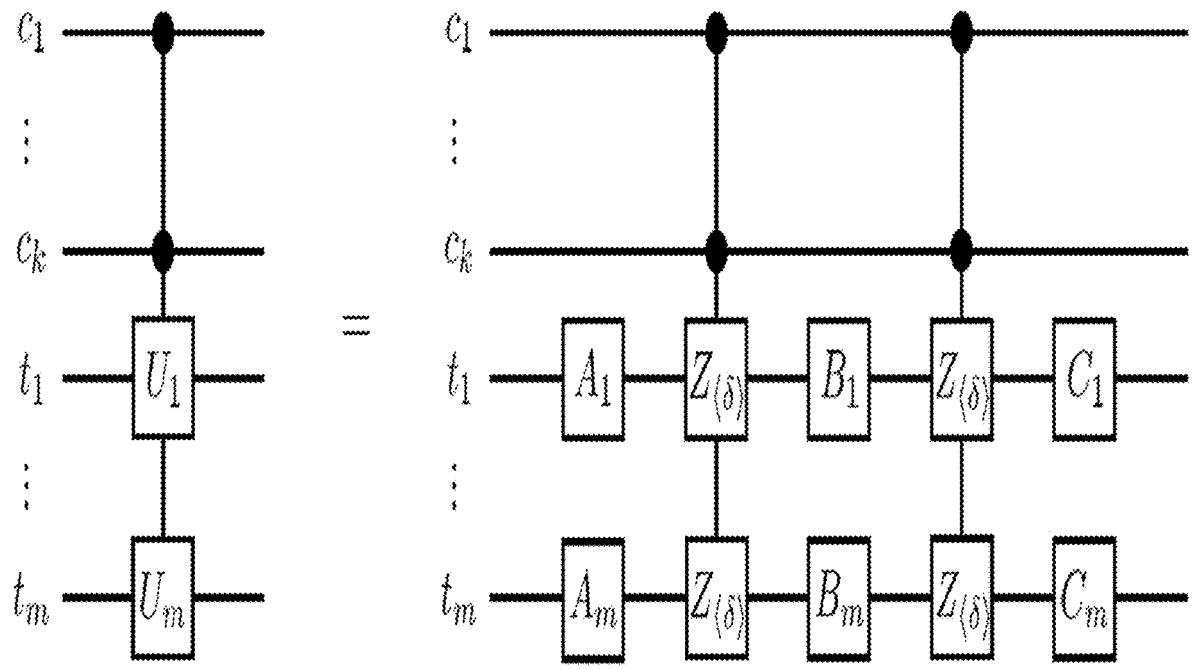
FIG. 4 shows a generalization of $C_k Z^m$ gates to $C_k U_1 \ldots U_m$ for general unitaries $U_i$. The control and target qubits are denoted by $c_i$ and $t_i$, respectively. $A_i, B_i, C_i \in SU(2)$ with $A_i B_i C_i = I$, and $Z_{\langle\delta\rangle} = e^{i\langle\delta\rangle/2}Z$. The unitaries applied to each target qubit are $U_i = e^{i\langle\delta\rangle} A_i Z B_i Z C_i$, which is equivalent to applying the unitaries $U_i = e^{i\delta_i} A_i Z B_i Z C_i$, where $$\frac{1}{m}\Sigma_i \delta_i = \langle\delta\rangle.$$

To fully realize general $U_i$, a phase needs to be applied. This can be achieved through a slight modification of the pulse sequence on the target atoms. Sometimes, the $2\pi$ pulse was applied using the same Rabi frequency throughout. If instead, there is applied two $\pi$ pulses using Rabi frequencies with different phases, the $|10\rangle$ state will pick up an extra phase based on the difference of the Rabi frequency phases, and $|10\rangle \to e^{i\delta/2}|10\rangle$. By applying an extra pair of $\pi$ pulses from the $|1\rangle$ state of the target qubits to the $|t\rangle$ state, we can realize $|11\rangle \to e^{i\delta/2}|11\rangle$. Applying the necessary Pauli-X gates to the target qubit, the resulting gate applied to the target qubit is $Z_\delta \equiv e^{i\delta/2}Z$. Using this controlled gate in place of the CZ gates above, the corresponding unit y is then $U^i = e^{i\delta i}W_i$. Since the phases for all the $U_i$ add together, we only need to realize a single overall phase $\Sigma_i \delta_i$. To reduce the local control of the phase needed, we use the same phase $$\langle \delta \rangle = \frac{1}{m} \Sigma_i \delta_i$$

for all the target qubits. This gate sequence is illustrated in FIG. 4.

Alternatively, one could apply the necessary phase $\Sigma_i \delta_i$ through just one of the target qubits, while the remaining target qubits contribute no phase. Additionally, in the case where there is only a single control qubit, we only need to the $|1\rangle$ state of the control qubit via a single-qubit gate.

The control and target atoms can be dressed with different fields. This involves using dressing fields that have wavelengths which are small compared to the atomic spacing. This could be achieved via a two-photon process through a low-energy state (e.g., a ground state) which couples the $|p_0\rangle$ and $|p_+\rangle$ states, although large Rabi frequencies will be more difficult to achieve. Alternatively, it may be possible to achieve this by taking advantage of light shifts due to optical drives. Since these light shifts can be applied locally, this allows for a degree of local control over the Rabi frequencies and detunings of the microwave drives.

For fixed magnitudes of the coefficients of the dressed states, the intraspecies interaction is maximized when $t_0$, $t_+$ are real and have opposite signs. This can be achieved by taking $\Omega_{c,0} = \Omega_{t,0}$, $\Omega_{c,+} = -\Omega_{t,+}$, where the first subscript denotes whether the drive is applied to a control (c) or target (t) atom and the second subscript denotes the polarization of the drive. Taking normalization factors into account, the maximal interaction is given by $$\langle ct | V_{dd} | ct \rangle = \pm \frac{4c_0 t_0 \mu_0^2}{N_0^2 N_1^2} \frac{1 - 3\cos^2\theta}{r^3}, \tag{11}$$

where $N_0^2 = 1 + (1+2M^2)|C_0|^2$, $N_1^2 = 1 + (1+2M^2)|t_0|^2$ are normalization factors and $M = \mu_0/\mu_+$. The interaction is maximized (in magnitude) when $c_0 = \pm t_0 = \sqrt{1+2M^2}^{-1}$, where it takes the value $$\langle ct|V_{dd}|ct \rangle = \pm \frac{1}{\mu_0^{-2} + 2\mu_+^{-2}} \frac{1 - 3\cos^2\theta}{r^3}, \tag{12}$$

which is the harmonic mean of the two individual dipole-dipole interactions. This is generally larger than can be achieved when the atoms are dressed with the same drives. Off-diagonal interactions need not be considered in general, as the different drives will result in different light shifts, so the off-diagonal interactions will be off-resonant.

There are four degrees of freedom in the dressed states ($c_0$, $c_+$, $t_0$, $t_+$) and three constraints (orthogonality and no intraspecies interactions). This leaves one degree of freedom in the dressed state coefficients, defined as $\alpha$, as well as one degree of freedom in the overall scale of the dressing, which is captured via $\Omega_0$. In order to determine the dressing parameters $\Omega_0$, $\Omega_+$, $\Delta_0$, $\Delta_+$ that satisfy these constraints, we require that the control and target Rydberg states be eigenstates of the dressing Hamiltonian:

$$H_{mw}|c\rangle = E_c|c\rangle, \quad H_{mw}|t\rangle = E_t|t\rangle. \tag{13}$$

$$|c_0|^2\mu_0^2 - |c_+|^2\mu_+^2/2 = 0, \quad |t_0|^2\mu_0^2 - |t_+|^2\mu_+^2/2 = 0,$$
$$1 + c_0 t_0^* + c_+ t_+^* = 0,$$

$$E_c = \Omega_0 c_0 + \Omega_+ c_+ = \Omega_0/c_0 - \Delta_0 = \Omega_+/c_+ - \Delta_+, \tag{14b}$$

$$E_t = \Omega_0 t_0 + \Omega_+ t_+ = \Omega_0/t_0 - \Delta_0 = \Omega_+/t_+ - \Delta_+. \tag{14c}$$

The dressing parameters can be rescaled by an overall constant factor without modifying these equations. The other degree of freedom is captured through $\alpha$ $$c_0 = \frac{\alpha}{\sqrt{|2M^2 - 1|}}. \tag{15}$$

The drives are given by $$\Omega_+ = \sqrt{2}M \frac{1 + c_0^2(1 - 2M^2)}{1 - c_0^2(1 - 2M^2)} \Omega_0, \tag{16a}$$

$$\Delta_0 = \frac{1 - 2c_0^2 + \alpha^4}{c_0(1 - c_0^2(1 - 2M^2))} \Omega_0,$$

$$\Delta_+ = \frac{1 - 4c_0^2 M^2 + \alpha^4}{c_0(1 - c_0^2(1 - 2M^2))} \Omega_0.$$

When $\alpha = 1$, $\Omega_+$ will either go to 0 or infinity, indicating the breakdown of the dressing in this limit, which we avoid regardless due to fact that $|c\rangle$, $|t\rangle$ become degenerate as well.

Due to the use of strong Rabi frequencies in preparing the dressed states, there are some scenarios in which the drives couple the desired states to additional undesired states. For example, the fine structure will often be comparable to the Rabi frequency used. Similarly, polarization impurity of the drives will lead to weak coupling to additional states.

Regarding coupling to additional states due to the strong Rabi frequencies, consider the scenario in which the $\Omega_0$ drive couples to a state $|p'0\rangle$ (in addition to the desired state $|p_0\rangle$) and the $\Omega_+$ drive couples to a state $|p_+\rangle$ (in addition to the desired state $|p_+\rangle$). For example, this can be important when $|p_0\rangle$, $|p_+\rangle$ are $p_{1/2}$ states and $|p'_0\rangle$, $|p'_+\rangle$ are the corresponding $p_{3/2}$ states. In some situations, such as for $^7$Li, the fine structure will be sufficiently small compared to the splitting between s and p states. Consequently, one can ignore the fine structure when the Rabi frequencies are sufficiently large. In other situations, such as for $^{87}$Rb, the fine structure is relatively large compared to the s and p splitting, so it cannot be ignored.

The new control and target Rydberg states will take the form $$|c'\rangle \propto |s\rangle + c_0|p_0\rangle + c_+|p_+\rangle + c_0'|p_0'\rangle + c_+'|p_+'\rangle,$$

$$|t'\rangle \propto |s\rangle + t_0|p_0\rangle + t_+|p_+\rangle + t_0'|p_0'\rangle + t_+'|p_+'\rangle. \quad (17)$$

The corresponding dressing Hamiltonian with basis order $|s\rangle$, $|p_0\rangle$, $|p_+\rangle$, $|p_0'\rangle$, $|p_+'\rangle$ will be given by $$H'_{mw} = \begin{pmatrix} 0 & \Omega_0 & \Omega_+ & f_0\Omega_0 & f_+\Omega_+ \\ \Omega_0 & -\Delta_0 & 0 & 0 & 0 \\ \Omega_+ & 0 & -\Delta_+ & 0 & 0 \\ f_0\Omega_0 & 0 & 0 & -\Delta_0 + E_0 & 0 \\ f_+\Omega_- & 0 & 0 & 0 & -\Delta_+ + E_+ \end{pmatrix}, \quad (18a)$$

$$f_0 = \langle p_0'|d_0|s\rangle / \langle p_0|d_0|s\rangle, \quad (18b)$$

$$f_+ = \langle p_+'|d_+|s\rangle / \langle p_+|d_+|s\rangle,$$

$$E_0 = E_{p_0'} - E_{p_0},$$

$$E_+ = E_{p_+'} - E_{p_+}.$$

The resulting requirements for negligible intraspecies interactions are $$|c_0 + f_0 c_0'|^2 \mu_0^2 - |c_+ + f_+ c_+'|^2 \mu_+^2/2 = 0,$$

$$|c_0 + f_0 c_0'|^2 \mu_0^2 - |c_+ + f_+ c_+'|^2 \mu_+^2 2 = 0. \quad (19)$$

Additionally, the new control and target Rydberg states are eigenstates of this dressing Hamiltonian: $H'_{mw}|c'\rangle = E'_c|c'\rangle$, $H'_{mw}|t'\rangle = E'_t|t'\rangle$. Note that due to the addition of two states, there will accordingly be two additional constraints coming from both $|c\rangle$ and $|t\rangle$, leading to four additional constraints. However, there will similarly be four new degrees of freedom in $c_0'$, $c_+'$, $t_0'$, $t_+'$, so there will still be two tunable parameters. This general behavior will hold for the inclusion of any number of additional states, thus always allowing for the simultaneous suppression of intraspecies vdW interactions.

Although the constraints will no longer be unchanged by rescaling $\Omega_{0/+}$, $\Delta_{0/+}$ by a constant factor, this does not mean a reduction from two tunable parameters to one. This is because the requirement that $|c'\rangle$, $|t'\rangle$ be orthogonal is in some sense redundant. As long as these two states are eigenstates of $H'_{mw}$ with $E'_c = E'_t$, this will automatically be satisfied. Since we are avoiding degeneracy already, this is not an issue.

Unlike for the case of three states, the above equations cannot be solved exactly. As a result, they must be solved numerically. However, with the addition of extra states, this will lead to a larger number of solutions. This is because one can consider control/target Rydberg states which are primarily composed of the primed states. In order to avoid this issue, take advantage of the fact that as $\Omega_{0/+}$, $\Delta_{0/+} \to 0$, the five-level system approaches the original three-level system. Thus, one can solve these equations numerically while adiabatically increasing the strength of the drive, providing the dressed states which are adiabatically connected to the original three-level dressed states.

The above analysis can be considered when additional states are moderately dressed by the fields. For additional states that are weakly dressed, either due to a larger detuning due to level spacing or a smaller Rabi frequency due to polarization impurity, their effect on the dressed states will be minimal. It is not the case that the weak dressing means that their contribution to the original three-level (or five-level) dressed states will be more strongly modified due to the interactions because corrections due to interactions depend on the ratio of the interactions to the light shifts, not the ratio of the interactions to the dressing parameters themselves. Indeed, this situation corresponds qualitatively to the small $\Omega_0$ limit in FIG. 5, where both the suppression of interspecies dipole-dipole interactions holds and the perturbative calculations remain valid. Since the weak dressing will only weakly modify the light shifts, the dressed-state basis will remain a good basis at the same distances.

In a method used for calculating van der Waals interactions for the dressed states, assume that the atomic separation is sufficiently large that $C_6$ can be determined via second-order perturbation theory. Due to the degeneracy of the states used in the dressing with undressed states and the fact that the microwave Rabi frequencies are large compared to the dipole-dipole interactions, it is important to take into account light shifts due to the dressing. In the rotating frame, the Hamiltonian of the system is given by $$H(t) = \sum_d E_d|d\rangle\langle d| + \sum_u E_u|u\rangle\langle u| + V_{dd}(t), \quad (20)$$

where $|d\rangle$ denotes the dressed states in the rotating frame, $|u\rangle$ the states not dressed by the drives, and $V_{dd}$ is the dipole-dipole interaction. In the rotating frame, the dipole-dipole interactions take the form $$V_{dd}(t) = \sum_{i,j,k,l} V_{ik}^{jl} e^{i(v_i + v_j - v_k - v_l)t} |w_i w_j\rangle\langle w_k w_l|, \quad (21)$$

where $v_{ik}^{jl} = \langle w_i w_j|V_{dd}|w_k w_l\rangle$, $v$ defines the rotating frame for the corresponding state, and $|w\rangle$ are the original Rydberg states prior to any dressing. Note that the angular dependence of the above interactions is no longer purely $1-3\cos^2\theta$, and interactions which do not preserve total $m_J$ will play a role. These take the form $$V_1(\theta, \phi) \propto \frac{3}{\sqrt{2}} \sin\theta\cos\theta e^{-i\delta m_J \phi}, \text{ where } |\delta m_J| = 1, \quad (22)$$

$$V_1(\theta, \phi) \propto \frac{3}{2} \sin\theta\cos\theta e^{-i\delta m_J \phi}, \text{ where } |\delta m_J| = 2. \quad (23)$$

Here $\delta_{m_J}$ indicates the change in total $m_J$ due to the interaction. Presence of these terms that do not preserve total $m_J$ prevents the suppression of vdW interactions in 3D.

Due to the presence of multiple rotating frames, there is no single rotating frame which removes all time dependence, which is necessary to apply time-independent perturbation theory. Instead, we apply a Floquet approach and expand the states in a quasi-energy series $$|ww'\rangle = \sum_{n_0, n_+} e^{i(n_0 v_0 + n_+ v_+)t} |ww'\rangle_{n_0, n_+}, \quad (24)$$

where $n_{0/+}$ are integers that label the harmonic. Practically speaking, this has the effect of shifting the energy defect for a given rotating term by $n_0v_0+n_+v_+$. The perturbative corrections to the target-target interactions are $$V_{tt}^{vdW} = \sum_{\alpha,\beta} \frac{\left|\sum_{v_i+v_j-v_k-v_l=C} R_{tv_i}R_{tv_j}R^*_{\alpha v_k}R^*_{\beta v_l}V_{v_iv_k}^{v_jv_l}\right|^2}{2E_t - E_\alpha - E_\beta + v_i + v_j - v_k - v_l} +$$

$$\sum_{\alpha,l} \frac{2\left|\sum_{v_i+v_j-v_k=C} R_{ti}R_{tj}R^*_{\alpha k}V_{v_iv_k}^{v_ju_l}\right|^2}{2E_t - E_\alpha + v_i + v_j - v_k} +$$

$$\sum_{k,l} \frac{\left|\sum_{v_i+v_j=C} R_{tv_i}R_{tv_j}V_{v_iu_k}^{v_ju_l}\right|^2}{2E_t + v_i + v_j - v_k},$$

where C is a constant, $|v\rangle$ are the states which are dressed, and $$|v_i\rangle = \Sigma_j R_{i\alpha}|d_\alpha\rangle$$

defines the transformation from the dressed to undressed basis and analogous equations follow for other vdW interactions. Each term in the above sum corresponds to contributions from $$|d_\alpha d_\beta\rangle, |d_\alpha u_l\rangle, |u_l d_\alpha\rangle, \text{ and } |u_k u_l\rangle,$$

respectively. The light shifts are taken into account via $E_{\alpha,\beta}$ (as well as $E_{c,t}$). These allow one to tune the vdW interactions and lift the degeneracy of the states involved in the dressing.

Figure 5:
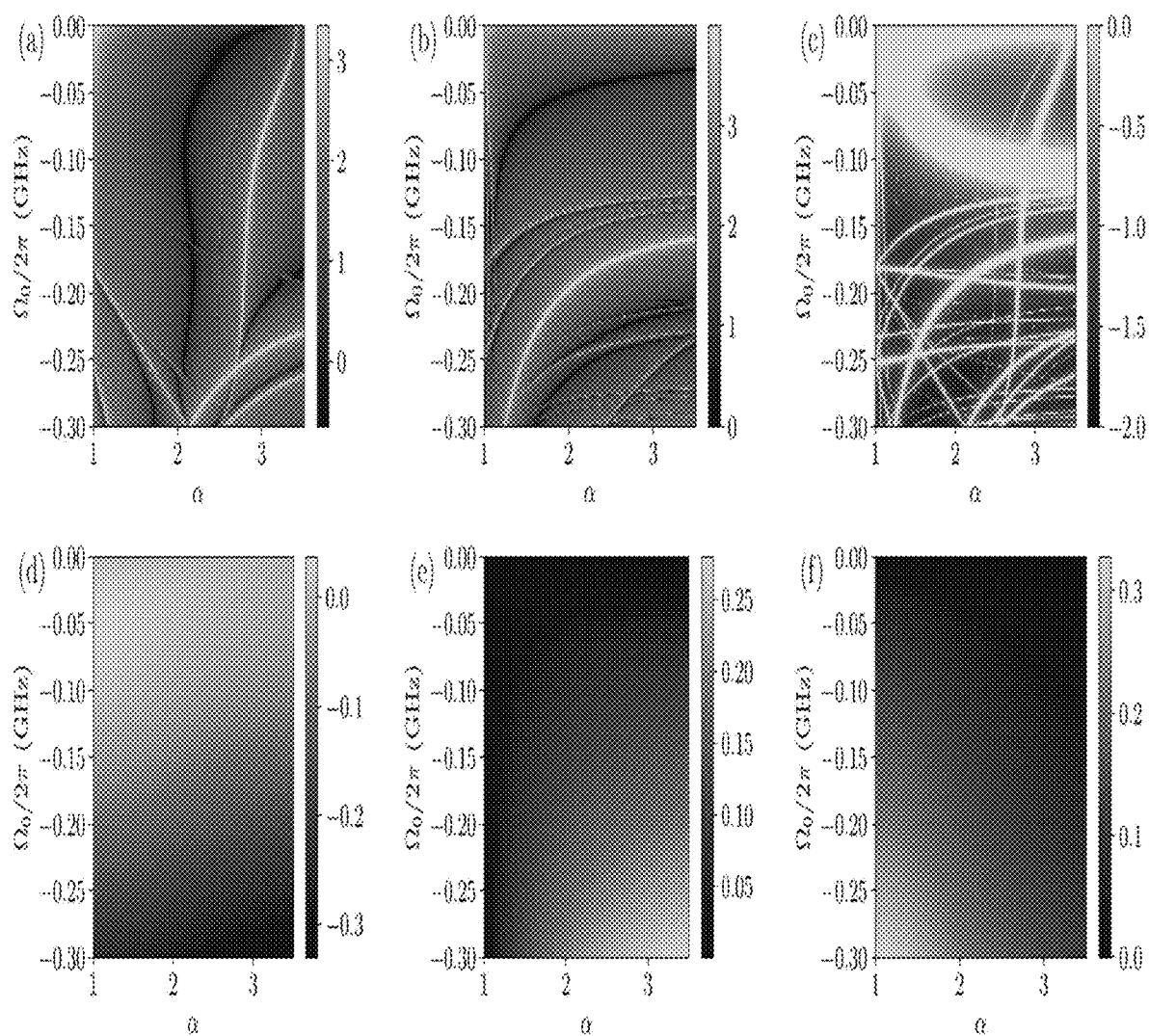
FIG. 5 shows perturbative calculations for the Rydberg levels considered in the main text, with $|s\rangle=|n=60, L=0, J=\frac{1}{2}, m_J=\frac{1}{2}\rangle$, $|p_0\rangle=|n=60, L=1, J=\frac{1}{2}, m_J=\frac{1}{2}\rangle$, $|p_+\rangle=|n=59, L=1, J=\frac{1}{2}, m_J=-\frac{1}{2}\rangle$, $|p_0'\rangle=|n=60, L=1, J=3/2, m_J=\frac{1}{2}\rangle$, $|p_+'\rangle=|n=59, L=1, J=3/2, m_J=-\frac{1}{2}\rangle$. Panels show: (a) $\log_{10} C_6^{(t)}/2\pi$, (b) $\log_{10} C_6^{(c)}/2\pi$, (c) $\log_{10}\langle 1-|\langle\psi(\infty)|\psi_1 a d\rangle|^2\rangle_\psi$, wherein $\langle\cdot\rangle_\psi$ denotes the average over $|cc\rangle$, $|tt\rangle$, $|tt\rangle$, $|\pm\rangle$ at the lattice spacing $a_0=6.1$ μm, (d) $\Delta_0/2\pi$, (e) $\Omega_+ 2\pi$, and (f) $\Delta_+ 2\pi$. $C_6$ values are expressed in GHz μm⁶, and energies are expressed in GHz.

FIG. 5 shows perturbative results and corresponding dressing parameters for the levels discussed in the main text. To find a good choice of dressing parameters for the gates, one should identify a point where one of the vdW interactions of the two dressed states becomes small while remaining in the perturbative regime. Other dressing parameters generally are of the same order of $\Omega_0$. Although this behavior will change if the level structure is modified, it is qualitatively independent of changes in n. This is because although the overall energy scale changes (~1/n³), the relative energy scales remain similar. This does mean that larger (smaller) n will require longer (shorter) distances to ensure the dipole-dipole interactions do not overwhelm the dressing. Although the corresponding gate times will be longer (shorter), this will be compensated by the lifetime scaling with n³, so the gate performance will be relatively insensitive to the choice of n. Hence one should choose n based on the relevant achievable Rabi frequencies and lattice spacings.

To go beyond perturbation theory, we can diagonalize the Hamiltonian in the Floquet basis under the rotating wave approximation. Just like in typical Rydberg systems, we may truncate the Hilbert space by using two-atom states be within some range of energy of the dressed states.

Sources of error in implementing the $C_kZ^m$ gates include dissipation, nonzero vdW interactions, and imperfect blockade. The first of these, dissipation is account is given by the dissipation rate for a given (dressed) Rydberg state $|r\rangle$ times the time the atom is in that state: $\gamma_r t_r$.

For errors due to nonzero vdW interactions, the effect of intraspecies and interspecies vdW interactions are considered separately. Here, errors due to the intraspecies interactions are considered. Since the inter-species interactions involve blockade effects, consider them in the context of imperfect blockade. The effect that the intraspecies interactions have is to make the $\pi$ and $2\pi$ pulses imperfect. For the control atoms, this error will always be present; for the target atoms, consider such errors when the $2\pi$ pulse is not blockaded, allowing for multiple target atoms to be excited. In both the $C_8Z^8$ gate and the GHZ state creation protocol, the number of controls or targets being excited by a given pulse is sufficiently small that we may determine exactly the overlap between the resulting state and the final state in the absence of interactions. In general, this will be of order $V^2_{vdW}/\Omega_g^2$.

Before discussing interspecies vdW interactions, consider the effect of imperfect blockade. In the limit of no intraspecies interactions, it is possible to determine the state after the $2\pi$ pulse exactly. This is because the effect of the control Rydberg state is to put an effective detuning on the target Rydberg states. Since the target atoms do not interact, they can be treated independently with their own configuration-dependent effective detunings. The behavior of the atoms can be determined via the application of a $2\pi$ pulse with detuning $-V_b$, where $V_b$ is the sum of the blockading interactions with a given target atom. Each target atom contributes an overlap after the $2\pi$ pulse of $$\langle \psi_0 | \psi_{2\pi}\rangle = e^{-i\pi v}\left(\cos\left(\pi\sqrt{1+v^2}\right) + \frac{iv}{\sqrt{1+v^2}}\sin\left(\pi\sqrt{1+v^2}\right)\right), \quad (26)$$

where $v = V_b/2\Omega_g^{(t)}$, $|\psi_0\rangle$ is the initial state of the atom, and $|\psi_{2\pi}\rangle$ is the final state of the atom. For perfect blockade (i.e., $v \to \infty$), $|\psi_0\rangle = |\psi_{2\pi}\rangle$ as expected.

When interspecies vdW interactions play a role, assuming a perturbative regime, then the effect of these interactions is to break the degeneracy between symmetric interactions (Vs) and antisymmetric interactions (Va). In principle, this will lead to the control atoms to effectively hop. However, since this behavior will essentially be restricted to the strong nearest-neighbor interactions, the probability of such events is exceedingly small, and thus can be safely ignored. However, unlike the previous case, we cannot solve this analytically even for the two atom case. In spite of this, we can approximate the overlap as $$\langle \psi_0 | \psi_{2\pi}\rangle \approx e^{-i\pi v_s}\left(\cos\left(\pi\sqrt{f^2+v_s^2}\right) + \frac{iv_s}{\sqrt{f^2+v_s^2}}\sin\left(\pi\sqrt{f^2+v_s^2}\right)\right) \times \quad (27)$$

$$e^{-i\pi v_a}\left(\cos\left(\pi\sqrt{f^2+v_a^2}\right) + \frac{iv_a}{\sqrt{f^2+v_a^2}}\sin\left(\pi\sqrt{f^2+v_a^2}\right)\right).$$

where $f = 1/\sqrt{2}$. Treat the system as if driving two different control atoms whose Rabi frequencies have been reduced by a factor of $\sqrt{2}$ due to the symmetric/antisymmetric basis. Although this is not exact, is accurate. For $$0 < \left|\frac{v_s - v_a}{v_s + v_a}\right| < 1/5,$$

the relative error is less than $3.5(v_s+v_a)^{-3}$.

Since this symmetric/antisymmetric basis is essentially restricted to the nearest-neighbor interactions, this error will be negligible. Similarly, we use the same approach for the many-body case, splitting the contribution of nearest-neighbor blockade interactions into a symmetric and antisymmetric part and $f = 2^{-N_{sa}/2}$ ($N_{sa}$ is the number of control atoms that require splitting into symmetric/antisymmetric parts). The relative error and up to four nearest neighbors remains under $0.025(v_s+v_a)^{-1}$, which is negligible since these are corrections to the cases where blockade is the strongest, so use this approximation when taking into account the effect of interspecies vdW interactions. Included is the effects of the intraspecies vdW interactions exactly in contexts: when the control atoms are being excited; and when the target atoms are not blockaded. The only case this excludes is when the target atoms are blockaded, in which case the small target atom vdW interactions play an insignificant role.

The Average Fidelity $$\bar{F}(G,U) = \int |\langle \psi | U^\dagger G | \psi \rangle|^2 d\psi. \tag{28}$$

Due to the large Hilbert space, consider Haar random sampling of $|\psi\rangle$. For each random $|\psi\rangle$, we may use the above overlaps for each bit string to determine the corresponding $|\langle \psi | U^\dagger G | \psi \rangle|^2$. We consider a sufficient number of samples such that the standard error is less than $10^{-4}$. For the 4×4 lattice, this requires 400 samples; for the 3×3 lattices, this requires 2000 samples. The larger number of samples for the smaller lattice is due to the larger variance of the fidelities.

Because Eq. (28) is an integral over all input states, not a sum over computational basis states, it captures all errors except for a single overall global phase on the entire unitary. Such an overall global phase error can be easily corrected with a single-qubit gate applied on any of the qubits participating in the gate. Alternatively, it can be reduced.

The overall global phase error that are not captured by Eq. (28), as well as errors in the relative phases for different computational basis states that are captured by Eq. (28) come largely from the fact that each blockaded target atom in $|0\rangle$ will pick up a phase of approximately $\pi \Omega_g^{(t)}/V_b$. The resulting phase errors can be reduced through a proper modification of the $2\pi$ pulses applied to the target atoms. If the phase of the Rabi frequency changes as a function of time, the phase the target atom picks up as a result of the pulse can be modified (e.g. a $\pi$ pulse then $-\pi$ pulse picks up no phase). The corresponding modification to the blockaded phase $\pi \Omega_g^{(t)}/V_b$ is negligible. This is was used to produce $C_k U_1 \ldots U_m$ gates. Thus, by modifying this phase, it can be ensured that when the target atom is not blockaded, $|0\rangle$ picks up a phase of $\pi \Omega_g^{(t)} \langle V_b^{-1} \rangle$, wherein $\langle V_b^{-1} \rangle$ is the average value a given target atom experiences when in the $|0\rangle$ state. The phases of each target atom can then be removed with single-qubit gates on these atoms, reducing the effect of both global and relative phase errors. When there is only a single blockade interaction for each target atom, these phase errors are eliminated entirely such As for the GHZ state creation. For the error presented above, these phases have been optimized in this fashion.

To investigate the remaining global phase error, consider a different definition of the average infidelity $$\varepsilon = \int \langle \psi | (U-G)^\dagger (U-G) | \psi \rangle d\psi, \tag{29}$$

that is closely related to the operator norm and is zero if and only if U=G. The motivation for this definition can be understood by considering errors of the form $$G|\psi\rangle = \cos\theta_\psi e^{i\phi_\psi} U|\psi\rangle + \ldots, \tag{30}$$

for a given input state $|\psi\rangle$, which captures state leakage errors via $\theta_\psi$ and phase errors via $\phi_\psi$. In the limit of $\theta_\psi$, $\phi_\psi \ll 1$, these give $$1 - |\langle \psi | U^\dagger G | \psi \rangle|^2 \approx \theta_\psi^2, \tag{31a}$$

$$\langle \psi | (U-G)^\dagger (U-G) | \psi \rangle \approx \theta_\psi^2 + \phi_\psi^2. \tag{31b}$$

In addition to capturing the same state leakage error, $\varepsilon$ treats the phase error in a similar fashion. Using $\varepsilon$ in place of $1-\bar{F}$, the errors for the $C_8 Z^8$, $C_5 Z^4$, $C_4 Z^5$ gates are increased by 0.5%, 0.03%, and 0.07%, respectively, which are relatively small. If the phase errors are not minimized via modifications to the $2\pi$ pulse, the corresponding optimized errors for the $C_8 Z^8$ gate is 21% using $\Omega_g^{(t)}/2\pi=40$ kHz and for the $C_5 Z^4$ and $C_4 Z^5$ gates are 9.8% and 10.8% using $\Omega_g^{(t)}=\min V_b/10$, representing increases of 2.5%, 1.4%, and 1.9%.

Large GHZ states can be made using the multi-qubit gates. A controlled-NOT (CNOT) gate has the following behavior:

$$CNOT\left(\frac{|00\rangle + |10\rangle}{\sqrt{2}}\right) = \frac{|00\rangle + |11\rangle}{\sqrt{2}}. \tag{32}$$

By using any qubit part of the GHZ state as a control qubit and a target qubit in the $|0\rangle$ state, the size of the GHZ state can be sequentially increased. By using the multi-qubit gates developed in the main text, many qubits can be incorporated into the GHZ state in a single step. Although some of the gates are a $C_k Z^m$ gate, a $C_k NOT^m$ can be made either via a modification to the pulse sequence or by applying single-qubit Hadamard gates to the target qubits before and after the $C_k Z^m$ gate.

With reference to FIG. 6, initially, all atoms are in a square lattice in the $|0\rangle$ state except for a single atom in the $(|0\rangle+|1\rangle)/\sqrt{2}$ state. This single atom will be the control atom while its four nearest neighbors are target atoms. A Hadamard gate is applied to the target qubits, taking them to the $(|0\rangle+|1\rangle)/\sqrt{2}$ state, upon which a $C_1 Z^3$ gate is applied. A Hadamard gate is applied to the target qubits once more, ending the first step and creating a 5-atom GHZ state. For the subsequent steps, the outermost atoms of the GHZ state are controls while their nearest neighbors outside of the GHZ state are targets.

The resulting error for each step is $$\varepsilon = N_c \frac{\pi}{4\Omega_g^{(c)} \tau_c} + N_c \frac{\pi}{2\Omega_g^{(t)} \tau_c} + N_t \frac{\pi}{8\Omega_g^{(t)} \tau_t} + \frac{1}{2} N_t \langle V_b^{-2} \rangle (\Omega_g^{(t)})^2, \tag{33}$$

where $N_c$ ($N_t$) is the number of control (target) atoms a fixed value $\Omega_g^{(c)}/2\pi=1$ MHz and phase errors have been removed. The first term is from decay of the control atoms during the $\pi$ pulses on the control atoms, the second term is from decay of the control atoms during the $2\pi$ pulse on the target atoms, the third term is from decay of the target atoms during the $2\pi$ pulse on the target atoms, and the fourth term is from imperfect blockade in the large interaction limit of Eqs. (26, 27) according to $1 - |\langle \psi | U^\dagger G | \psi \rangle|^2$. Since there is only a single blockade interaction, phase errors can be eliminated entirely by modifying the phases of the $2\pi$ pulses applied to the target atoms. Although the fidelity for each step is determined independently, the resulting error is consistent with calculating the fidelity of the corresponding gate products for each size of GHZ state. Contributions from vdW interactions are dropped since they can be made negligible with suitable dressing. This error has a minimum $$\epsilon = \frac{3\pi^{2/3} N_t^{1/3}(4N_c\tau_t + N_t\tau_c)^{2/3}}{8(\bar{V}\tau_c\tau_t)^{2/3}} + N_c\frac{\pi}{4\Omega_g^{(c)}\tau_c}, \quad (34)$$

For the first, second, and third steps, Vnn is the nearest-neighbor interaction, and vdW corrections are neglected to the interspecies interactions. This continues to decrease before reaching a limit of •($<V_{nn}/V_b>$)2•=0.196 for large steps. If we include the effect of the interspecies vdW corrections, $(<V_{+-}/V_b>)^2$=1.06, 0.5, 0.38, where $V_{+-}$ is the mean of the symmetric and antisymmetric interspecies interaction. This reaches a limit of •$(<V_{+-}/V_b>)^2$=0.21 for large steps. The errors in the GHZ state preparation are 0.9%, 2.8%, and 5.8% for 5-, 13-, and 25-atom GHZ states, respectively. The corresponding first, second, and third steps use $\Omega_g^{(t)}/2\pi$=218, 316, 369 kHz drives, respectively. Approximately one third of the error is due to the infidelity, while the rest is due to dissipation. If we include the effects of the vdW errors (both state leakage and phase) according to Eq. (S29) when the pulses are not blockaded, the corresponding errors are increased by 0.02%, 0.07%, and 0.16%, respectively, which are negligible as expected. Since the sign of the phase error is related to the relative sign of the vdW interactions and the pulse Rabi frequencies, the contribution from the phase error can be reduced by changing the sign of $\Omega_g^{(t)}$ for different steps. If 1−F is used instead, the vdW contributions to the error are sufficiently small that they do not modify the values reported in the absence of vdW interactions.

The processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A process for producing a multi-controlled and multi-target Z gate, the process comprising:
   providing a plurality of atoms, wherein the atoms comprise:
   a set of control atoms; and
   a set of target atoms,
   wherein each atom comprises an initial quantum state, such that the initial quantum state consists essentially of a first state $|0\rangle$ and a second state $|1\rangle$ in a ground state manifold;
   for each atom:
   making a control Rydberg state $|c\rangle$ by applying a $\pi$-polarized microwave drive and a $\sigma$-polarized microwave drive, such that the control Rydberg state $|c\rangle$ comprises a superposition of three or more initial Rydberg states; and
   making a target Rydberg state $|t\rangle$ by applying the $\pi$-polarized microwave drive and the $\sigma$-polarized microwave drive, such that the target Rydberg state $|t\rangle$ comprises a different superposition of the three or more initial Rydberg states, wherein:
   the control Rydberg state $|c\rangle$ is orthogonal to the target Rydberg state $|t\rangle$;
   control Rydberg states of different atoms do not interact via dipole-dipole interactions;
   target Rydberg states of different atoms do not interact via dipole-dipole interactions; and
   among different atoms, control Rydberg states interact with target Rydberg states via dipole-dipole interactions;
   subjecting control atoms to a $\pi$ pulse, such that the $\pi$ pulse transitions the first state $|0\rangle$ of the initial quantum state to the control Rydberg state $|c\rangle$ in the control atoms;
   subjecting a $2\pi$ pulse to the first state $|0\rangle$ of the target atoms via the target Rydberg state $|t\rangle$ of the target atoms, such that the $2\pi$ pulse:
   for all control atoms in the second state $|1\rangle$, changes the phase of the first state $|0\rangle$; and
   otherwise, for at least one control atom in the control Rydberg state $|c\rangle$, conserves the phase of the first state $|0\rangle$; and
   subjecting the control atoms to a second $\pi$ pulse, such that the second $\pi$ pulse transitions the control Rydberg state $|c\rangle$ back to the first state $|0\rangle$ in the control atoms to produce the multi-control and multi-target Z gate.

2. The process of claim 1, wherein the atoms comprise a neutral alkali atom, an alkaline-earth atom, an alkaline-earth-like atom, or a combination comprising at least one of the foregoing types of atoms.

3. The process of claim 1, wherein the multi-controlled and multi-target Z gate is a $C_k Z^m$ gate, wherein k is the number of control atoms and m is the number of target atoms.

4. The process of claim 1, further comprising adjusting drive parameters of the $\pi$-polarized microwave drive and the $\sigma$-polarized microwave drive, so that:
   atoms in the control Rydberg state $|c\rangle$ have negligible interactions with atoms in the control Rydberg state $|c\rangle$;
   atoms in the target Rydberg state $|t\rangle$ have negligible interactions with atoms in the target Rydberg state $|t\rangle$; and
   atoms in control Rydberg state $|c\rangle$ have interact strongly with atoms in target Rydberg state $|t\rangle$.

5. The process of claim 4, wherein the drive parameters comprise Rabi frequencies and detuning frequencies of the $\pi$-polarized microwave drive and the $\sigma$-polarized microwave drive.

6. The process of claim 1, wherein the initial Rydberg states comprise an s state, a p state, or a combination comprising at least the foregoing states.

7. A process for producing a generalized controlled-not quantum gate, the process comprising:
   providing a plurality of atoms, wherein the atoms comprise:
   a set of control atoms; and
   a set of target atoms,
   wherein each atom comprises an initial quantum state, such that the initial quantum state consists essentially of a first state $|0\rangle$ and a second state $|1\rangle$ in a ground state manifold;

subjecting the target atoms to a single-qubit Hadamard gate;
for each atom:
  making a control Rydberg state $|c\rangle$ by applying a π-polarized microwave drive and a σ-polarized microwave drive, such that the control Rydberg state $|c\rangle$ comprises a superposition of three or more initial Rydberg states; and
  making a target Rydberg state $|t\rangle$ by applying the π-polarized microwave drive and the σ-polarized microwave drive, such that the target Rydberg state $|t\rangle$ comprises a different superposition of the three or more initial Rydberg states, wherein:
  the control Rydberg state $|c\rangle$ is orthogonal to the target Rydberg state $|t\rangle$;
  control Rydberg states of different atoms do not interact via dipole-dipole interactions;
  target Rydberg states of different atoms do not interact via dipole-dipole interactions; and
  among different atoms, control Rydberg states interact with target Rydberg states via dipole-dipole interactions;
subjecting control atoms to a π pulse, such that the π pulse transitions the first state $|0\rangle$ of the initial quantum state to the control Rydberg state $|c\rangle$ in the control atoms;
subjecting the first state $|0\rangle$ of the target atoms to a 2π pulse via the target Rydberg state $|t\rangle$ of the target atoms, such that the 2π pulse:
  for all control atoms in the second state $|1\rangle$, changes the phase of the first state $|0\rangle$; and
  otherwise, for at least one control atom in the control Rydberg state $|c\rangle$, conserves the phase of the first state $|0\rangle$; and
subjecting the control atoms to a second π pulse, such that the second π pulse transitions the control Rydberg state $|c\rangle$ back to the first state $|0\rangle$ in the control atoms to produce a multi-control and multi-target Z gate; and
subjecting the target atoms in the multi-control and multi-target Z gate to a second single-qubit Hadamard gate to produce the generalized controlled-not quantum gate.

8. The process of claim 7, wherein the atoms comprise a neutral alkali atom, an alkaline-earth atom, an alkaline-earth-like atom, or a combination comprising at least one of the foregoing types of atoms.

9. The process of claim 7, wherein the multi-controlled and multi-target Z gate is a $C_k Z^m$ gate, wherein k is the number of control atoms and m is the number of target atoms.

10. The process of claim 7, further comprising adjusting drive parameters of the π-polarized microwave drive and the σ-polarized microwave drive, so that:
  atoms in the control Rydberg state $|c\rangle$ have negligible interactions with atoms in the control Rydberg state $|c\rangle$;
  atoms in the target Rydberg state $|t\rangle$ have negligible interactions with atoms in the target Rydberg state $|t\rangle$; and
  atoms in control Rydberg state $|c\rangle$ interact strongly with atoms in target Rydberg state $|t\rangle$.

11. The process of claim 10, wherein the drive parameters comprise Rabi frequencies and detuning frequencies of the π-polarized microwave drive and the σ-polarized microwave drive.

12. The process of claim 7, wherein the initial Rydberg states comprise an s state, a p state, or a combination comprising at least the foregoing states.

13. A process for preparing a metrologically-relevant entangled state, the process comprising:
  providing a plurality of atoms arranged in a regular lattice, wherein each atom comprises an initial quantum state, such that the initial quantum state consists essentially of a first state $|0\rangle$ in a ground state manifold;
  initializing a central atom of the atoms in the regular lattice to a $(|0\rangle+|1\rangle)/\sqrt{2}$ state, such that all other atoms remain in the first state $|0\rangle$ as remaining atoms; and
  proceeding, starting with the central atom, to propagate preparation of Greenberger-Horne-Zeilinger (GHZ) states in a nonlinear progression by increasing a number of GHZ states in each iteration through the remaining atoms in a recursive manner, to produce an intermediate GHZ state, such that the intermediate GHZ state acts as an initial GHZ state for a next iteration, until a final GHZ state is formed to prepare the metrologically-relevant entangled state of the atoms.

14. The process of claim 13, wherein the metrologically-relevant entangled state comprises the GHZ state.

15. The process of claim 13, wherein the regular lattice is a square lattice, a triangular lattice, or a honeycomb lattice.

16. A process for preparing a metrologically-relevant entangled state, the process comprising:
  providing a plurality of atoms arranged in a regular lattice, wherein each atom comprises an initial quantum state, such that the initial quantum state consists essentially of a first state $|0\rangle$ in a ground state manifold;
  initializing a central atom of the atoms in the regular lattice to a $(|0\rangle+|1\rangle)/\sqrt{2}$ state to produce a GHZ state that includes the central atom, such that:
    all other atoms remain in the first state $|0\rangle$ as remaining atoms;
    the central atom is a control atom; and
    the nearest neighbor atoms to control atom are target atoms;
  subjecting the target atoms to a Hadamard gate, such that target atoms are configured to $(|0\rangle+|1\rangle)/\sqrt{2}$ state;
  subjecting the control atom and the target atoms to a $C_{k=1}Z^m$ gate;
  subjecting the target atoms to another Hadamard gate to increase the number of atoms in the GHZ state; and
  repetitively increasing the size of the GHZ state, wherein during each repetition the outermost atoms of the GHZ state are used as control atoms while the nearest neighbor atoms to the control atoms outside of the GHZ state are used as target atoms, by performing the following GHZ-increasing steps:
    subjecting the target atoms to a Hadamard gate, such that target atoms are configured to $(|0\rangle+|1\rangle)/\sqrt{2}$ state;
    subjecting the control atoms and the target atoms to a $C_k Z^m$ gate;
    subjecting the target atoms to another Hadamard gate to increase the number of atoms in the GHZ state to prepare the metrologically-relevant entangled state; and
  repeating the GHZ-increasing steps.

17. The process of claim 16, wherein subjecting the target atoms in $(|0\rangle+|1\rangle)/\sqrt{2}$ state and the control atoms to the $C_k Z^m$ gate comprises:

for each target atom:
- making a control Rydberg state $|c\rangle$ by applying a π-polarized microwave drive and a σ-polarized microwave drive, such that the control Rydberg state $|c\rangle$ comprises a superposition of three or more initial Rydberg states; and
- making a target Rydberg state $|t\rangle$ by applying the π-polarized microwave drive and the σ-polarized microwave drive, such that the target Rydberg state $|t\rangle$ comprises a different superposition of the three or more initial Rydberg states, wherein:
  - the control Rydberg state $|c\rangle$ is orthogonal to the target Rydberg state $|t\rangle$;
  - control Rydberg states of different atoms do not interact via dipole-dipole interactions;
  - target Rydberg states of different atoms do not interact via dipole-dipole interactions; and
  - among different atoms, control Rydberg states interact with target Rydberg states via dipole-dipole interactions;

subjecting control atoms to a π pulse, such that the π pulse transitions the first state $|0\rangle$ of the initial quantum state to the control Rydberg state $|c\rangle$ in the control atoms;

subjecting the first state $|0\rangle$ of the target atoms to a 2π pulse via the target Rydberg state $|t\rangle$ of the target atoms, such that the 2π pulse:
- for all control atoms in the second state $|1\rangle$, changes the phase of the first state $|0\rangle$; and
- otherwise, for at least one control atom in the control Rydberg state $|c\rangle$, conserves the phase of the first state $|0\rangle$; and subjecting the control atoms to a second π pulse, such that the second π pulse transitions the control Rydberg state $|c\rangle$ back to the first state $|0\rangle$ in the control atoms to produce a multi-control and multi-target Z gate.

18. The process of claim 16, wherein the metrologically-relevant entangled state comprises the GHZ state.

19. The process of claim 16, wherein the regular lattice comprises a square lattice, a triangular lattice, or a honeycomb lattice.

20. The process of claim 17, wherein the atoms comprise a neutral alkali atom, an alkaline-earth atom, an alkaline-earth-like atom, or a combination comprising at least one of the foregoing types of atoms; and the initial Rydberg states comprise an s state, a p state, or a combination comprising at least the foregoing states.

* * * * *